US011861501B2

(12) United States Patent
Chen

(10) Patent No.: US 11,861,501 B2
(45) Date of Patent: Jan. 2, 2024

(54) SEMANTIC SEGMENTATION METHOD AND APPARATUS FOR THREE-DIMENSIONAL IMAGE, TERMINAL, AND STORAGE MEDIUM

(71) Applicant: TENCENT TECHNOLOGY (SHENZHEN) COMPANY LIMITED, Shenzhen (CN)

(72) Inventor: Sihong Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 609 days.

(21) Appl. No.: 17/074,629

(22) Filed: Oct. 20, 2020

(65) Prior Publication Data

US 2021/0049397 A1    Feb. 18, 2021

Related U.S. Application Data

(63) Continuation of application No. PCT/CN2019/110562, filed on Oct. 11, 2019.

(30) Foreign Application Priority Data

Oct. 16, 2018    (CN) .......................... 201811204375.4

(51) Int. Cl.
*G06N 3/08* (2023.01)
*G06V 10/26* (2022.01)
(Continued)

(52) U.S. Cl.
CPC ............. *G06N 3/084* (2013.01); *G06N 3/045* (2023.01); *G06N 3/08* (2013.01); *G06V 10/26* (2022.01);
(Continued)

(58) Field of Classification Search
CPC .......... G06N 3/084; G06N 3/045; G06N 3/08; G06N 3/048; G06V 10/26; G06V 10/30;
(Continued)

(56) References Cited

U.S. PATENT DOCUMENTS 9,968,257 B1 * 5/2018 Burt ...................... A61B 5/0035
10,898,152 B1 * 1/2021 Kim ..................... A61B 6/5217
(Continued)

FOREIGN PATENT DOCUMENTS

CN    104463825 A    3/2015
CN    104809723 A    7/2015
(Continued)

OTHER PUBLICATIONS

The World Intellectual Property Organization (WIPO) International Search Report for PCT/CN2019/110562 dated Jan. 19, 2020 5 Pages (including translation).
(Continued)

*Primary Examiner* — John W Lee
(74) *Attorney, Agent, or Firm* — ANOVA LAW GROUP, PLLC

(57) ABSTRACT

A semantic segmentation method and apparatus for a three-dimensional image, and a storage medium are provided. The method includes: obtaining a three-dimensional image; slicing the three-dimensional image according to three directional planes, to obtain two-dimensional slice images of an x axis, two-dimensional slice images of a y axis, and two-dimensional slice images of a z axis; invoking a first segmentation model, a second segmentation model, and a third segmentation model to respectively perform semantic segmentation on the two-dimensional slice images of the x axis, the y axis, and the z axis, to obtain distribution probability maps of a target object on the three directional planes; and obtaining a three-dimensional distribution
(Continued)

binary image of the target object by invoking an adaptive fusion model to perform three-dimensional fusion on the three distribution probability maps respectively corresponding to an x-axis directional plane, a y-axis directional plane, and a z-axis directional plane.

17 Claims, 12 Drawing Sheets

(51) Int. Cl.
*G06V 10/30* (2022.01)
*G06V 10/764* (2022.01)
*G06V 10/82* (2022.01)
*G06V 20/64* (2022.01)
*G06N 3/084* (2023.01)
*G06V 20/40* (2022.01)
*G06N 3/045* (2023.01)
*G06V 10/44* (2022.01)

(52) U.S. Cl.
CPC ............ *G06V 10/30* (2022.01); *G06V 10/454* (2022.01); *G06V 10/764* (2022.01); *G06V 10/82* (2022.01); *G06V 20/41* (2022.01); *G06V 20/64* (2022.01); *G06V 2201/03* (2022.01)

(58) Field of Classification Search
CPC .... G06V 10/454; G06V 10/764; G06V 10/82; G06V 20/41; G06V 20/64; G06V 2201/03; G06V 10/267; G06F 18/253; G06F 18/24; G06T 2207/10028; G06T 2207/10081; G06T 2207/10088; G06T 2207/10116; G06T 2207/20081; G06T 2207/20084; G06T 2207/30048; G06T 2207/30056; G06T 2207/30061; G06T 2207/30092; G06T 7/11
See application file for complete search history.

(56) References Cited

U.S. PATENT DOCUMENTS

| | | | | |
|---|---|---|---|---|
| 2008/0260221 | A1* | 10/2008 | Unal | G06T 7/149 |
| | | | | 382/128 |
| 2018/0218497 | A1 | 8/2018 | Golden et al. | |
| 2018/0232897 | A1 | 8/2018 | Masuda | |

FOREIGN PATENT DOCUMENTS

| | | | | |
|---|---|---|---|---|
| CN | 105513036 | A | 4/2016 | |
| CN | 105957066 | A | 9/2016 | |
| CN | 106548178 | A | 3/2017 | |
| CN | 107644426 | A | 1/2018 | |
| CN | 107749061 | A | 3/2018 | |
| CN | 108198184 | A | 6/2018 | |
| CN | 108389251 | A | 8/2018 | |
| CN | 109446951 | A | 3/2019 | |
| WO | 2017106645 | A1 | 6/2017 | |
| WO | WO-2017106645 | A1 * | 6/2017 | ............. A61B 6/032 |
| WO | 2018081537 | A1 | 5/2018 | |

OTHER PUBLICATIONS

The State Intellectual Property Office of the People's Republic of China (SIPO) Office Action 1 for 201811204375.4, dated Jul. 16, 2019 13 Pages (including translation).

Vijay Badrinarayanan et al.; "SegNet: A Deep Convolutional Encoder-Decoder Architecture for Image Segmentation", IEEE Transactions on Pattern Analysis & Machine Intelligence, vol. 39, No. 12, Dec. 31, 2017 (Dec. 31, 2017), pp. 2484-2486 15 pages.

The European Patent Office (EPO) The Extended European Search Report for 19872855.2. Nov. 9, 2021 11 Pages.

* cited by examiner

SEMANTIC SEGMENTATION METHOD AND APPARATUS FOR THREE-DIMENSIONAL IMAGE, TERMINAL, AND STORAGE MEDIUM

CROSS-REFERENCES TO RELATED APPLICATIONS

This application is a continuation application of PCT Patent Application No. PCT/CN2019/110562, filed on Oct. 11, 2019, which claims priority to Chinese Patent Application No. 201811204375.4, entitled "SEMANTIC SEGMENTATION METHOD AND APPARATUS FOR THREE-DIMENSIONAL IMAGE, DEVICE, AND STORAGE MEDIUM" and filed with the National Intellectual Property Administration, PRC on Oct. 16, 2018, the entire contents of both of which are incorporated herein by reference.

FIELD OF THE TECHNOLOGY

The present disclosure relates to the field of deep learning, and in particular, to a semantic segmentation method and apparatus for a three-dimensional image, a terminal, and a storage medium.

BACKGROUND OF THE DISCLOSURE

In a medical image, a shape or volume change of human organs or tissues has an important implication for clinical diagnosis. Image regions in which the human organs or tissues are located in the medical image can be obtained by performing semantic segmentation on the medical image by using a deep learning model.

In the related art, semantic segmentation is performed on a two-dimensional medical image by using a pyramid scene parsing network (Pspnet). The Pspnet is a semantic segmentation technology based on deep learning. The Pspnet acquires feature maps in a plurality of scales by using convolution kernels of various different sizes, and finally performs interpolation on the outputted feature maps to scale up the feature maps, to obtain a semantic segmentation result.

However, the Pspnet is a semantic segmentation technology for a two-dimensional natural image, and cannot perform semantic segmentation on a three-dimensional medical image.

SUMMARY

Various embodiments provided in the present disclosure provide a semantic segmentation method and apparatus for a three-dimensional image, a terminal, and a storage medium. The technical solutions are as follows:

According to an aspect of the embodiments of this disclosure, a semantic segmentation method for a three-dimensional image performed by a terminal is provided, the method including: obtaining a three-dimensional image; slicing the three-dimensional image according to three directional planes in which three-dimensional coordinate axes are located, to obtain two-dimensional slice images of an x axis, two-dimensional slice images of a y axis, and two-dimensional slice images of a z axis; invoking a first segmentation model to perform semantic segmentation on the two-dimensional slice images of the x axis, to obtain a distribution probability map of a target object on an x-axis directional plane; invoking a second segmentation model to perform semantic segmentation on the two-dimensional slice images of they axis, to obtain a distribution probability map of the target object on a y-axis directional plane; invoking a third segmentation model to perform semantic segmentation on the two-dimensional slice images of the z axis, to obtain a distribution probability map of the target object on a z-axis directional plane; and obtaining a three-dimensional distribution binary image of the target object by invoking an adaptive fusion model to perform three-dimensional fusion on the three distribution probability maps respectively corresponding to the x-axis directional plane, the y-axis directional plane, and the z-axis directional plane.

According to another aspect of the embodiments of this disclosure, a semantic segmentation method for a two-dimensional image is provided, the method including: obtaining, by a terminal, a two-dimensional image; invoking, by the terminal, a segmentation model to perform semantic segmentation on the two-dimensional image, to obtain a distribution probability map of a target object; and obtaining, by the terminal, a two-dimensional distribution binary image of the target object through calculation according to a maximum probability category of each pixel in the distribution probability map. The segmentation model includes: a deep network encoding unit and a skip transfer decoding unit, the deep network encoding unit including n convolutional layers, and the skip transfer decoding unit including m deconvolution layers, both n and m being a positive integer. The deep network encoding unit is configured to perform down-sampling feature extraction on the two-dimensional image through the n convolutional layers, to obtain a down-sampled third intermediate feature map; and the skip transfer decoding unit is configured to perform up-sampling processing on the third intermediate feature map and a fourth intermediate feature map through the m deconvolution layers, to obtain an up-sampled distribution probability map, the fourth intermediate feature map including a feature map outputted by an $i^{th}$ convolutional layer of the n convolutional layers, i being an integer less than or equal to n.

According to another aspect of the embodiments of this disclosure, a semantic segmentation apparatus for a three-dimensional image is provided, the apparatus including: a processor and a memory, the memory storing computer-readable instructions. The processor, when executing the computer-readable instructions, is configured to obtain a three-dimensional image; slice the three-dimensional image according to three directional planes in which three-dimensional coordinate axes are located, to obtain two-dimensional slice images of an x axis, two-dimensional slice images of a y axis, and two-dimensional slice images of a z axis; invoke a first segmentation model to perform semantic segmentation on the two-dimensional slice images of the x axis, to obtain a distribution probability map of a target object on an x-axis directional plane, invoke a second segmentation model to perform semantic segmentation on the two-dimensional slice images of they axis, to obtain a distribution probability map of the target object on a y-axis directional plane; invoke a third segmentation model to perform semantic segmentation on the two-dimensional slice images of the z axis, to obtain a distribution probability map of the target object on a z-axis directional plane; and obtain a three-dimensional distribution binary image of the target object by invoking an adaptive fusion model to perform three-dimensional fusion on the three distribution probability maps respectively corresponding to the x-axis directional plane, the y-axis directional plane, and the z-axis directional plane.

According to another aspect of the embodiments of this disclosure, a semantic segmentation apparatus for a two-dimensional image is provided, the apparatus including: a second obtaining module, configured to obtain a two-dimensional image; a second segmentation module, configured to invoke a segmentation model to perform semantic segmentation on the two-dimensional image, to obtain a distribution probability map of a target object; and a calculation module, configured to obtain a two-dimensional distribution binary image of the target object through calculation according to a maximum probability category of each pixel in the distribution probability map. The segmentation model including: a deep network encoding unit and a skip transfer decoding unit, the deep network encoding unit including n convolutional layers, and the skip transfer decoding unit including m deconvolution layers, both n and m being a positive integer; the deep network encoding unit being configured to perform down-sampling feature extraction on the two-dimensional image through the n convolutional layers, to obtain a down-sampled third intermediate feature map; and the skip transfer decoding unit being configured to perform up-sampling processing on the third intermediate feature map and a fourth intermediate feature map through the m deconvolution layers, to obtain an up-sampled distribution probability map, the fourth intermediate feature map including a feature map outputted by an $i^{th}$ convolutional layer of the n convolutional layers, i being an integer less than or equal to n.

According to another aspect of the embodiments of this disclosure, one or more non-volatile storage media storing computer-readable instructions are provided, the computer-readable instructions, when executed by one or more processors, causing the one or more processors to perform the method in the foregoing embodiments.

Details of one or more embodiments of the present disclosure are provided in the accompanying drawings and descriptions below. Other features, objectives, and advantages of the present disclosure will become apparent from the specification, the accompanying drawings, and the claims.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

Figure 1:
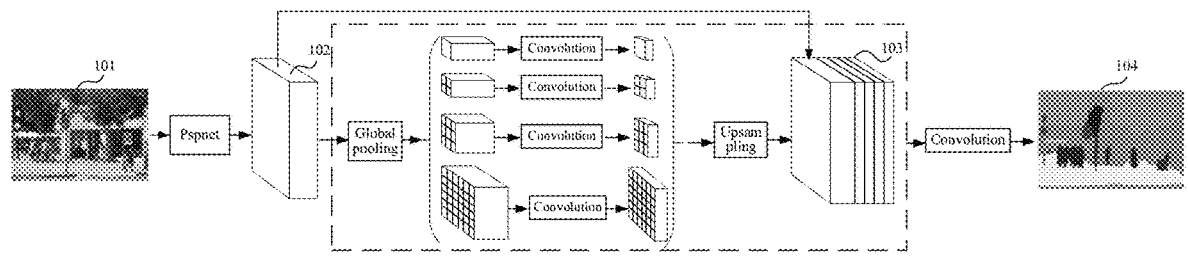
FIG. 1 is a schematic structural diagram of a Pspnet network model provided in the related art.

To make the objectives, technical solutions, and advantages of the present disclosure clearer and more comprehensible, the present disclosure is further described below in detail with reference to the accompanying drawings and the embodiments. It is to be understood that the specific embodiments described herein are merely used for explaining the present disclosure, but are not intended to limit the present disclosure. All other embodiments obtained by a person of ordinary skill in the art based on the embodiments of the present disclosure without creative efforts shall fall within the protection scope of the present disclosure.

First, several terms described in the embodiments of the present disclosure are introduced.

Semantic segmentation refers to dividing an image into several non-overlapping regions according to features such as the gray scale, color, texture, and shape of the image, and enabling the features to present similarity in the same region, and present obvious difference in different regions.

A three-dimensional image is an image added with a spatial dimension (for example, a depth dimension) or a temporal dimension compared to a two-dimensional image. For example, a three-dimensional medical image may be considered as a three-dimensional image added with a depth dimension, and a video may be considered as a three-dimensional image added with a temporal dimension.

A target object is an object belonging to a foreground region in semantic segmentation. For a three-dimensional medical image, the target object may be a target organ. The target organ is an internal organ or tissue of a human body, and/or an internal organ or tissue of an animal, such as the heart, lung, liver, spleen, and stomach. For a two-dimensional medical image, the target object may be a target organ. In the embodiments of the present disclosure, description is made mainly by using an example in which the target object is a human organ in a three-dimensional medical image.

In a medical image, a shape or volume change of human organs or tissues has an important implication for clinical diagnosis. To avoid false determining that may be generated during manual analysis, semantic segmentation is performed on a medical image by using a convolutional network model in the related art. That is, the medical image is inputted in the convolutional network model, features of corresponding human organs or tissues in the medical image are extracted by using the constructed convolutional network model, and the features of the human organs or tissues are classified, to obtain specific regions in which the human organs or tissues are located in the medical image. A human organ or tissue region and a background region can be distinguished in the medical image after the semantic segmentation, and then, a doctor performs clinical diagnosis. The "medical image" herein may include an X-ray image obtained by irradiating a human body with X-rays, a CT image obtained through computerized tomography (CT), and an MRI image obtained through magnetic resonance imaging (MRI). A medical image acquired by using a medical image acquisition device may be a 2D medical image, or may be a 3D medical image.

In an exemplary related art, a Pspnet is used for performing semantic segmentation on a 2D medical image. The Pspnet performs convolution on an inputted medical image by using convolution kernels of various different sizes, extracts features of the medical image, to form feature maps of various different sizes, and finally performs interpolation on the outputted feature maps to scale up the feature maps, to obtain a semantic segmentation result.

For example, as shown in FIG. 1, a medical image 101 is inputted into a Pspnet network model, to extract features of the medical image 101 and obtain a first feature map 102 having the same size as the medical image 101. Then, the Pspnet network model performs convolution calculation on the simplified first feature map 102 respectively by using convolution kernels of four different scales, to obtain four feature submaps corresponding to sizes of the convolution kernel. Sizes of the four feature submaps are different from each other. Next, the sizes of the four feature submaps of different sizes are scaled up through interpolation by using up-sampling to a size of the medical image 101, and the four scaled-up feature submaps are connected to the first feature map 102, to obtain a second feature map 103. Finally, a final probability map 104 is obtained after semantic segmentation is performed on the second feature map 103 through convolution.

However, the Pspnet can only perform semantic segmentation on a 2D medical image, and cannot perform semantic segmentation on a 3D medical image. When the medical image is a 3D medical image that has relatively high definition and detection accuracy, such as a CT image or an MRI image, if semantic segmentation is forcibly performed on the 3D medical image by using the Pspnet, a "fault phenomenon" may easily occur, and edge fitting after image segmentation cannot meet a requirement. In addition, the Pspnet cannot process the 3D medical image either.

The embodiments of the present disclosure provide a semantic segmentation method and apparatus for a three-dimensional image, a terminal, and a storage medium, to resolve the problem in the related art. In the method, semantic segmentation of a three-dimensional image can be implemented. Typically, the three-dimensional image is a three-dimensional medical image or a video. In the embodiments of the present disclosure, description is made by using an example in which the three-dimensional image is a three-dimensional medical image.

Figure 2:
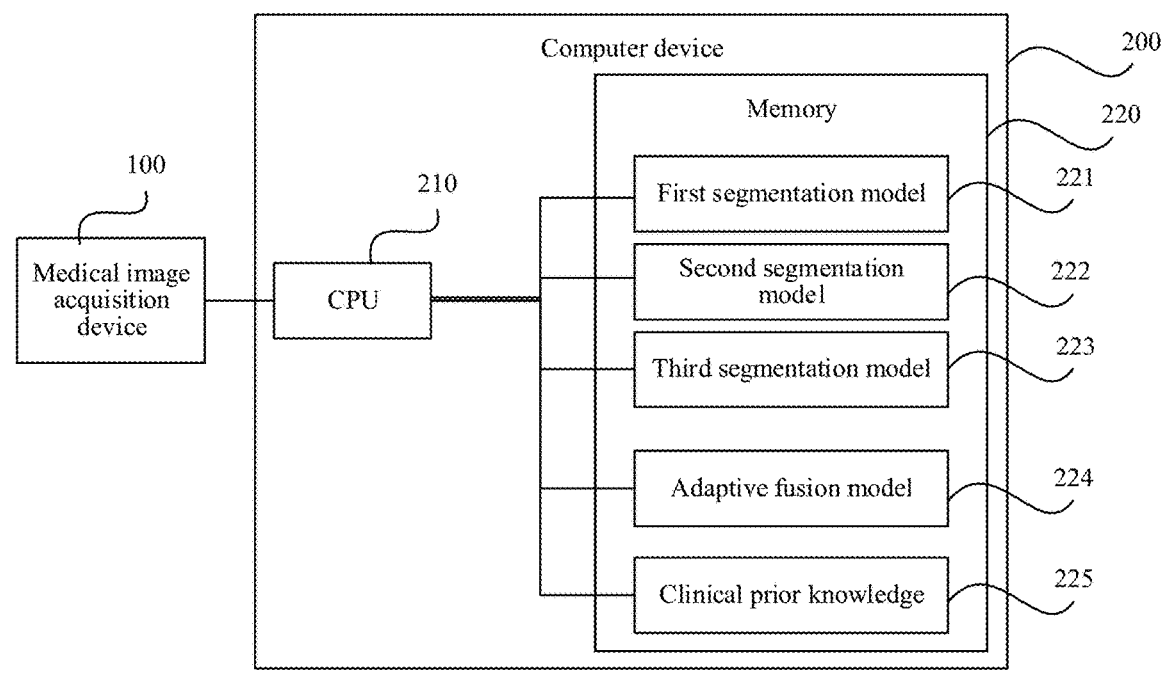
FIG. 2 is a schematic diagram of an implementation environment according to an exemplary embodiment of the present disclosure.

FIG. 2 is a schematic diagram of an implementation environment according to an exemplary embodiment of the present disclosure. A medical image acquisition device 100 and a computer device 200 are included in FIG. 2. It can be understood that, medical image is used as an exemplary embodiment and the disclosed method and system can be applied to other 3D images of other entities as well, such as a 3D image of a fossil.

The medical image acquisition device 100 is configured to acquire a medical image of a human organ or tissue. The medical image includes a two-dimensional medical image and a three-dimensional medical image. The medical image acquisition device 100 is further configured to transmit the acquired medical image to the computer device 200. The computer device 200 is configured to receive the medical image, and perform semantic segmentation on the medical image.

In some embodiments, the medical image acquisition device 100 may be a device independent of the computer device 200, or may be a device combined into the computer device 200 as a whole.

The computer device 200 includes a central processing unit (CPU) 210 and a memory 220.

The CPU 210 is configured to invoke a neural network model for implementing semantic segmentation. The memory 220 is configured to store the neural network model for implementing semantic segmentation. The neural network model includes a first segmentation model 221, a second segmentation model 222, a third segmentation model 223, and an adaptive fusion model 224. In some embodiments, the first segmentation model 221, the second segmentation model 222, and the third segmentation model 223 are two-dimensional models for performing semantic segmentation based on a convolutional neural network. The adaptive fusion model 224 is a three-dimensional model for performing adaptive fusion on semantic segmentation results of the three two-dimensional semantic segmentation models to obtain a three-dimensional semantic segmentation result.

The first segmentation model 221 is used for performing two-dimensional semantic segmentation on two-dimensional slice images of an x axis, to obtain a distribution probability map of a target organ on an x-axis directional plane.

The second segmentation model 222 is used for performing two-dimensional semantic segmentation on two-dimensional slice images of a y axis, to obtain a distribution probability map of the target organ on a y-axis directional plane.

The third segmentation model 223 is used for performing two-dimensional semantic segmentation on two-dimensional slice images of a z axis, to obtain a distribution probability map of the target organ on a z-axis directional plane.

The adaptive fusion model 224 is used for performing three-dimensional fusion on the three distribution probability maps respectively corresponding to the x-axis directional plane, the y-axis directional plane, and the z-axis directional plane, to obtain a three-dimensional distribution binary image of the target organ.

In some embodiments of the present disclosure, slicing is performed on a three-dimensional image according to three directional planes in which three-dimensional coordinate axes are located, semantic segmentation is then performed on two-dimensional slice images of the three directional planes by using three segmentation models, to obtain distribution probability maps of the three directional planes, and next, three-dimensional fusion is performed on the three distribution probability maps by using an adaptive fusion model, to obtain a final three-dimensional distribution binary image corresponding to a target object.

Figure 3:
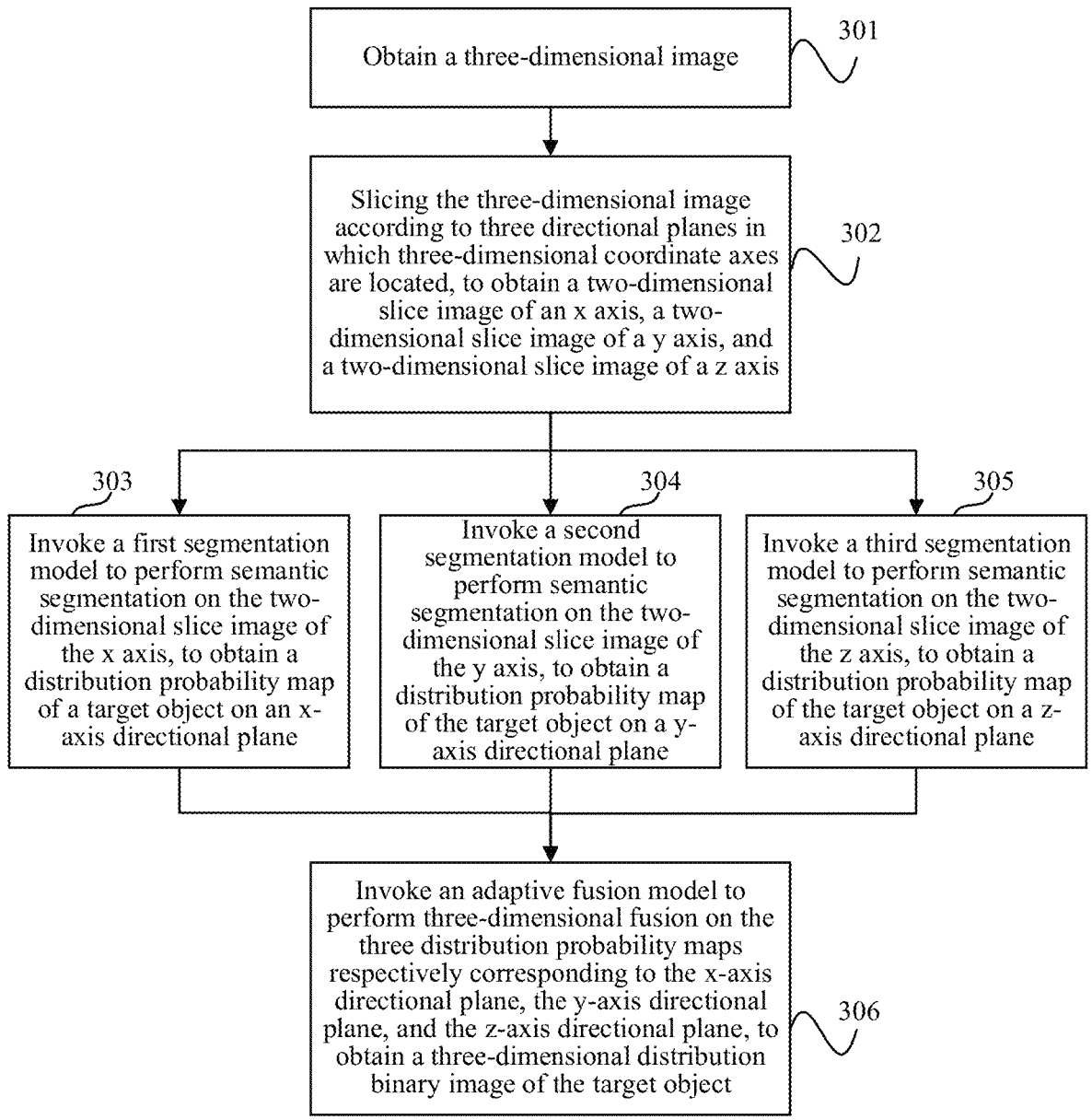
FIG. 3 is a flowchart of a semantic segmentation method for a three-dimensional image according to an exemplary embodiment of the present disclosure.

FIG. 3 is a flowchart of a semantic segmentation method for a three-dimensional image according to an exemplary embodiment of the present disclosure. The method may be applied to the implementation environment shown in FIG. 2, and includes:

Step 301. A terminal obtains a three-dimensional image.

In some embodiments, the terminal acquires a three-dimensional image by using an image acquisition device.

Step 302. The terminal performs slicing on the three-dimensional image according to three directional planes in which three-dimensional coordinate axes are located, to obtain two-dimensional slice images of an x axis, two-dimensional slice images of a y axis, and two-dimensional slice images of a z axis.

After obtaining the three-dimensional image, the terminal performs slicing on the three-dimensional image according to three directional planes in which three-dimensional coordinate axes are located, to obtain two-dimensional slice images of an x axis, two-dimensional slice images of a y axis, and two-dimensional slice images of a z axis.

An x-axis directional plane is a plane on which the x axis and the z axis are located, a y-axis directional plane is a plane on which the y axis and the z axis are located, and a z-axis directional plane is a plane on which the x axis and the y axis are located.

Step 303. The terminal invokes a first segmentation model to perform semantic segmentation on the two-dimensional slice images of the x axis, to obtain a distribution probability map of a target object on an x-axis directional plane.

The CPU invokes a first segmentation model stored in the memory to perform semantic segmentation on the two-dimensional slice images of the x axis. The first segmentation model completes a process of performing semantic segmentation on the two-dimensional slice images of the x axis according to features such as the gray scale, color, texture, and shape of the target object in the two-dimensional slice images of the x axis, thereby outputting a distribution probability map of the target object on an x-axis directional plane.

Step 304. The terminal invokes a second segmentation model to perform semantic segmentation on the two-dimensional slice images of the y axis, to obtain a distribution probability map of the target object on a y-axis directional plane.

The CPU invokes a second segmentation model stored in the memory to perform semantic segmentation on the two-dimensional slice images of they axis. The second segmentation model completes a process of performing semantic segmentation on the two-dimensional slice images of they axis according to features such as the gray scale, color, texture, and shape of the target object in the two-dimensional slice images of they axis, thereby outputting a distribution probability map of the target object on a y-axis directional plane.

Step 305. The terminal invokes a third segmentation model to perform semantic segmentation on the two-dimensional slice images of the z axis, to obtain a distribution probability map of the target object on a z-axis directional plane.

The CPU invokes a third segmentation model stored in the memory to perform semantic segmentation on the two-dimensional slice images of the z axis. The third segmentation model completes a process of performing semantic segmentation on the two-dimensional slice images of the z axis according to features such as the gray scale, color, texture, and shape of the target object in the two-dimensional slice images of the z axis, thereby outputting a distribution probability map of the target object on a z-axis directional plane.

Step 306. The terminal invokes an adaptive fusion model to perform three-dimensional fusion on the three distribution probability maps respectively corresponding to the x-axis directional plane, the y-axis directional plane, and the z-axis directional plane, to obtain a three-dimensional distribution binary image of the target object.

The CPU invokes an adaptive fusion model stored in the memory to perform adaptive fusion on the three obtained distribution probability maps corresponding to the x axis, the y axis, and the z axis. Because the adaptive fusion model fuses two-dimensional distribution probability maps in three different dimensions, much background noise may be suppressed, and edges of the target object are smoothly and accurately segmented, to finally obtain a three-dimensional distribution binary image of the target object.

Figure 4:
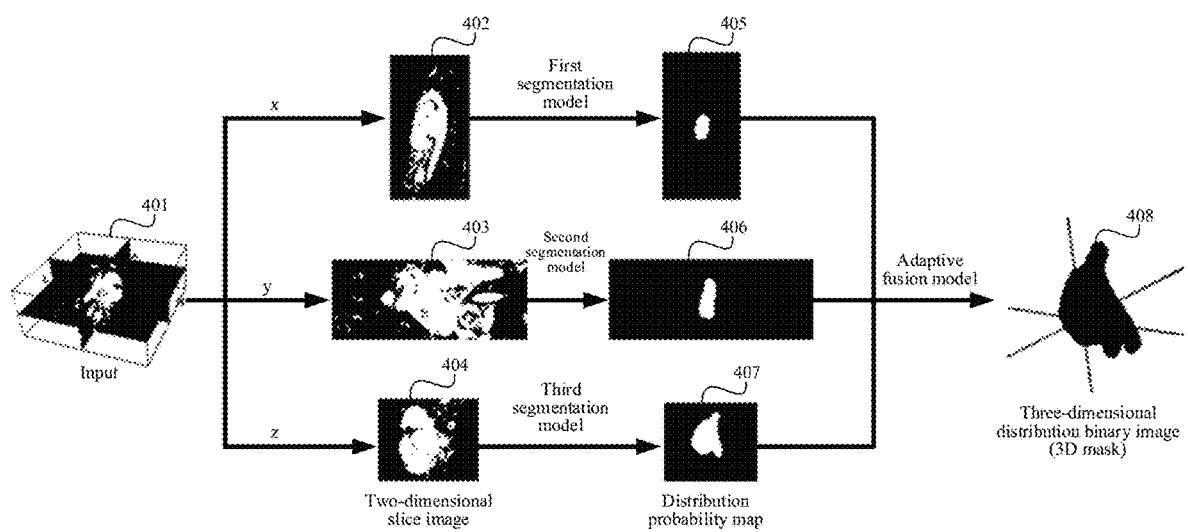
FIG. 4 is a schematic structural diagram of performing semantic segmentation on a three-dimensional medical image according to an exemplary embodiment of the present disclosure.

An example in which the three-dimensional image is a three-dimensional medical image is used. Referring to FIG. 4, a computer device respectively performs segmentation on an inputted three-dimensional medical image 401 on an x-axis directional plane, a y-axis directional plane, and a z-axis directional plane, to obtain two-dimensional slice images 402 of an x axis, two-dimensional slice images 403 of a y axis, and two-dimensional slice images 404 of a z axis, then performs two-dimensional semantic segmentation on the three groups of two-dimensional slice images, to obtain two-dimensional distribution probability maps 405 to 407 of the target object on the three directional planes, and then performs three-dimensional fusion on the three two-dimensional distribution probability maps 405 to 407 by using an adaptive fusion model, to obtain a three-dimensional distribution binary image 408 (3D Mask) of the target object.

In conclusion, in the method provided in some embodiments, slicing is performed on an obtained three-dimensional image according to the three directional planes in which three-dimensional coordinate axes are located, to obtain two-dimensional slice images corresponding to three directional planes, and then two-dimensional distribution probability maps corresponding to the three directional planes are obtained by using three segmentation models corresponding to the three directional planes, so that a terminal implements two-dimensional semantic segmentation on a three-dimensional medical image. Then, three-dimensional fusion is performed on the three distribution probability maps by using an adaptive fusion model, to obtain a three-dimensional distribution binary image of the target object, so that the problem in the related art that the Pspnet network model is only applicable to semantic segmentation on a 2D natural image, and cannot perform semantic segmentation on a 3D medical image is resolved. Therefore, semantic segmentation can be performed on the 3D medical image by using three 2D segmentation models and one adaptive fusion model, and because the adaptive fusion model fuses two-dimensional distribution probability maps in three different dimensions, background noise is effectively suppressed during three-dimensional fusion, so that edges of the target object are smoothly and accurately segmented.

Figure 5:
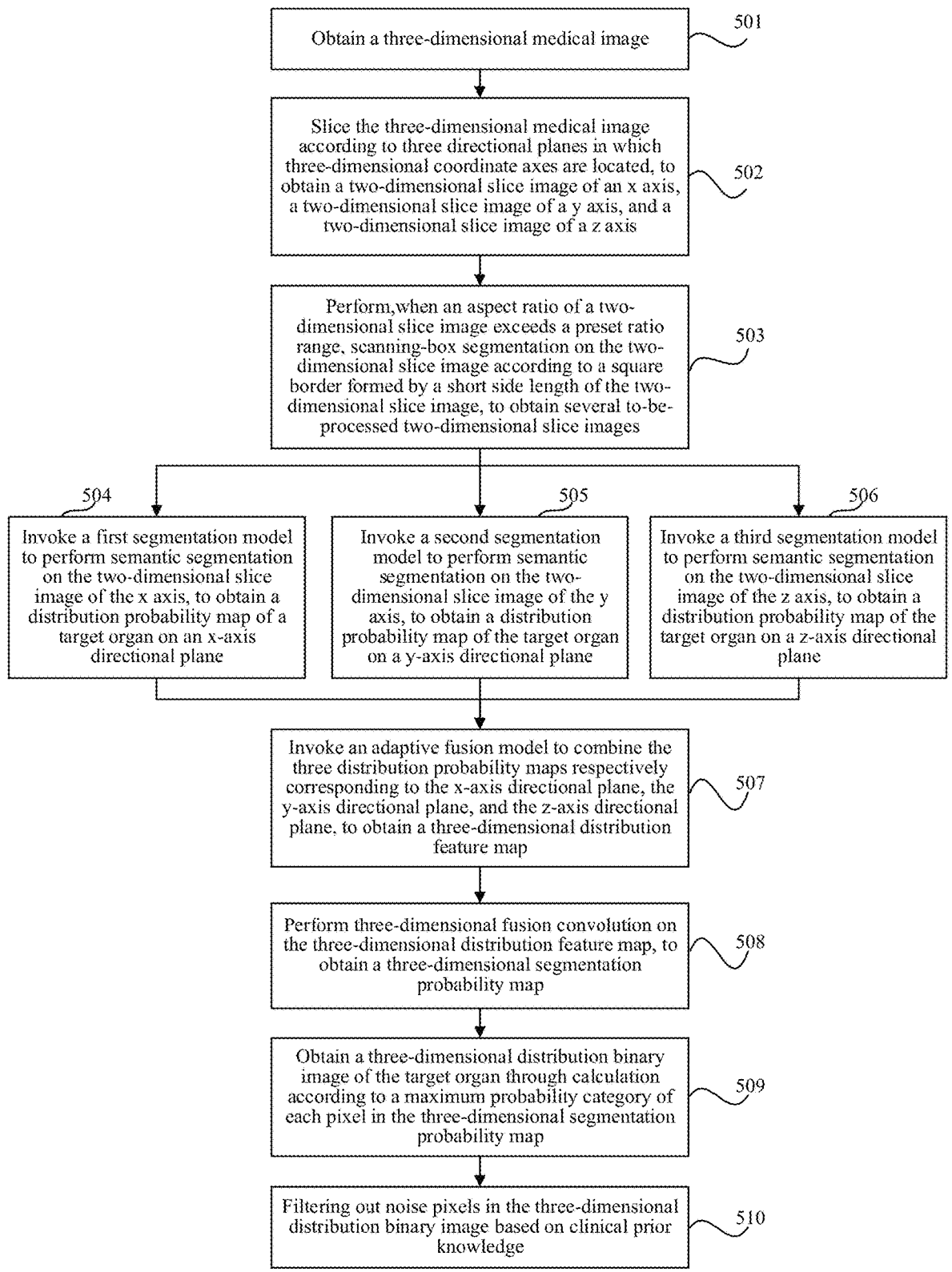
FIG. 5 is a flowchart of a semantic segmentation method for a three-dimensional image according to another exemplary embodiment of the present disclosure.

FIG. 5 is a flowchart of a semantic segmentation method for a three-dimensional image according to another exemplary embodiment of the present disclosure. The method may be applied to the implementation environment shown in FIG. 2. In some embodiments, description is made by using an example in which the three-dimensional image is a three-dimensional medical image and the target object is a target organ. The method includes the following steps:

Step 501. A terminal obtains a three-dimensional medical image.

The computer device acquires a three-dimensional medical image by using a medical image acquisition device, and the three-dimensional medical image includes a three-dimensional target organ, and a background region other than the target organ.

Step 502. The terminal performs slicing on the three-dimensional medical image according to three directional planes in which three-dimensional coordinate axes are located, to obtain two-dimensional slice images of an x axis, two-dimensional slice images of a y axis, and two-dimensional slice images of a z axis.

Therefore, after obtaining the three-dimensional medical image, the computer device performs slicing on the three-dimensional medical image according to three directional planes in which three-dimensional coordinate axes are located, to obtain two-dimensional slice images of an x axis, two-dimensional slice images of a y axis, and two-dimensional slice images of a z axis.

In some embodiments, because a distribution location of each type of target organ in the three-dimensional medical image is relatively fixed, the computer device further reads pre-stored first clinical prior knowledge, the first clinical prior knowledge being used for indicating a target value range of a candidate appearing location of the target organ in each two-dimensional slice image. For example, a transverse coordinate range of a candidate appearing location of a target organ A in the two-dimensional slice images of the x axis is [a1, a2], and a longitudinal coordinate range of a candidate appearing location of the target organ A in the two-dimensional slice images of the y axis is [b1, b2]. The target value range is used for performing first noise filtering in a post-processing process.

In some embodiments, because an external shape of each type of target organ is an ellipsoidal shape, the computer device further reads pre-stored second clinical prior knowledge, the second clinical prior knowledge being used for indicating a 3D ellipsoidal model of the target organ. For example, the computer device obtains, through statistics by using the second clinical prior knowledge, possible longest axes and shortest axes of the target organ on the three x-axis, y-axis, and z-axis directional planes, thereby pre-establishing a three-dimensional ellipsoidal model of the target organ. The three-dimensional ellipsoidal model indicates a candidate appearing location of the target organ in the three-dimensional medical image, and the three-dimensional ellipsoidal model is used for performing second noise filtering in the post-processing process.

Step 503. The terminal performs, when an aspect ratio of a two-dimensional slice image exceeds a preset ratio range, scanning-box segmentation on the two-dimensional slice image according to a square border formed by a short side length of the two-dimensional slice image, to obtain several to-be-processed two-dimensional slice images.

Because sizes of inputted images of segmentation models corresponding to the three coordinate axes are generally a square size, and in some implementations, a two-dimensional slice image is extremely long and narrow, the target organ is severely deformed after the long and narrow two-dimensional slice image is directly converted into an image of the square size, resulting in a failure in semantic segmentation. Therefore, the computer device may further process the two-dimensional slice image in the following image pre-processing manner.

In some embodiments, when an aspect ratio of an obtained two-dimensional slice image is within the preset ratio range, the computer device converts a size of the two-dimensional slice image into an input size that meets a segmentation model. The preset ratio range may be [⅓, 3].

Figure 6:
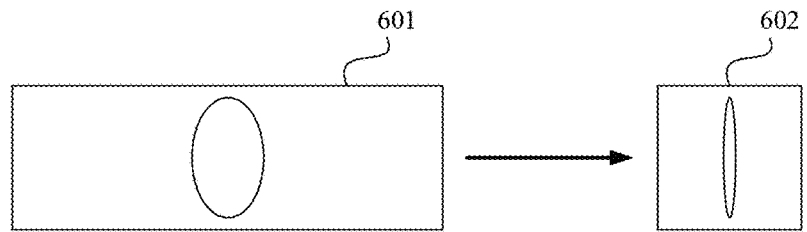
FIG. 6 is a schematic diagram showing a shape change of a target object without changing a size of a two-dimensional slice image according to another exemplary embodiment of the present disclosure.

In some embodiments, as shown in FIG. 6, when an aspect ratio of an obtained two-dimensional slice image exceeds the preset ratio range, that is, the aspect ratio of the two-dimensional slice image exceeds [⅓, 3], it is considered that the two-dimensional slice image is extremely long and narrow. If the computer device directly converts an original size of the two-dimensional slice image 601 into an input size 602, and the input size is a size meeting a pixel size of a segmentation model, a target organ in the two-dimensional slice image 601 is squeezed into a bar, resulting in an inaccurate final prediction result.

Figure 7:
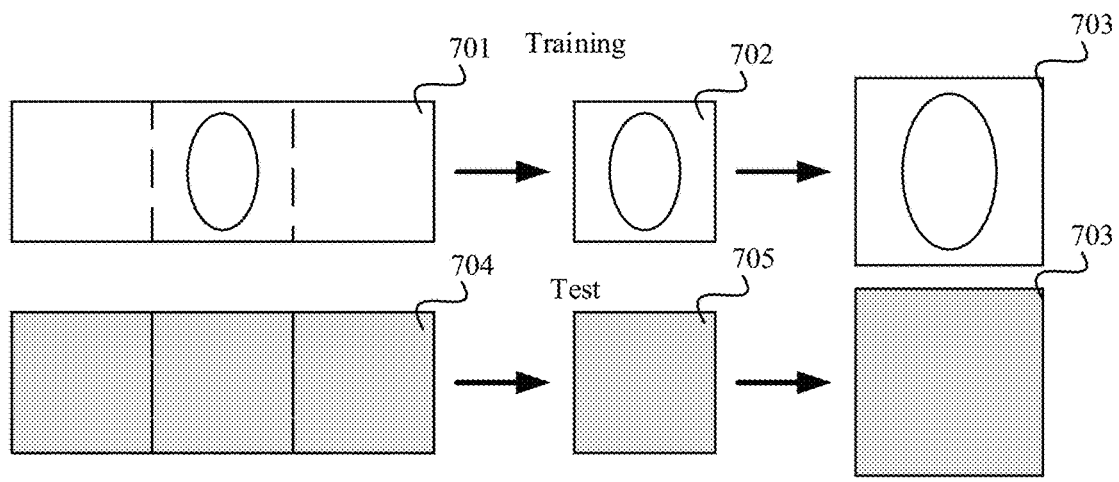
FIG. 7 is a schematic diagram showing that a shape of a target object is unchanged when a size of a two-dimensional slice image is changed according to another exemplary embodiment of the present disclosure.

In this case, as shown in FIG. 7, when training a segmentation model, the computer device performs segmentation on a two-dimensional slice image 701 that is obtained according to a sample image, according to a square border formed by a short side length of the two-dimensional slice image 701, to obtain an intermediate to-be-processed two-dimensional slice image 702. The computer device converts a size of the intermediate to-be-processed two-dimensional slice image 702 into an input size 703 of the segmentation model for training.

In a test process or a prediction process, the computer device performs scanning-box segmentation on a two-dimensional slice image 704 that is obtained according to the three-dimensional medical image, according to a square border formed by a short side length of the two-dimensional slice image 704, to obtain several to-be-processed two-dimensional slice images 705 (for example, three images in FIG. 7). Then, the computer device converts sizes of the several to-be-processed two-dimensional slice images 705 into an input size 703 of a segmentation model, and respectively inputs the several to-be-processed two-dimensional slice images 705 into the segmentation model for prediction.

Step 504. The terminal invokes a first segmentation model to perform semantic segmentation on the two-dimensional slice images of the x axis, to obtain a distribution probability map of a target organ on an x-axis directional plane.

The computer device invokes a first segmentation model stored in the memory to perform semantic segmentation on the two-dimensional slice images of the x axis. The first segmentation model completes a process of performing semantic segmentation on the two-dimensional slice images of the x axis according to features such as a distribution location, a size, and a shape of the target organ in the three-dimensional medical image, thereby outputting a distribution probability map of the target organ on an x-axis directional plane.

In some embodiments, the first segmentation model includes a deep network encoding unit and a skip transfer decoding unit, the deep network encoding unit including n convolutional layers, and the skip transfer decoding unit including m deconvolution layers, both n and m being a positive integer.

The deep network encoding unit is configured to perform down-sampling feature extraction on a two-dimensional slice image through the n convolutional layers, to obtain a down-sampled first intermediate feature map. The skip transfer decoding unit is configured to perform up-sampling processing on the first intermediate feature map and a second intermediate feature map through the m deconvolution layers, to obtain an up-sampled distribution probability map. The second intermediate feature map includes a feature map outputted by an $i^{th}$ convolutional layer of the n convolutional layers, i being an integer less than or equal to n.

In some embodiments, the deep network encoding unit is a neural network model constructed based on a residual network model, or the deep network encoding unit is a neural network model constructed based on another classification model, which is not limited in this embodiment.

Figure 8:
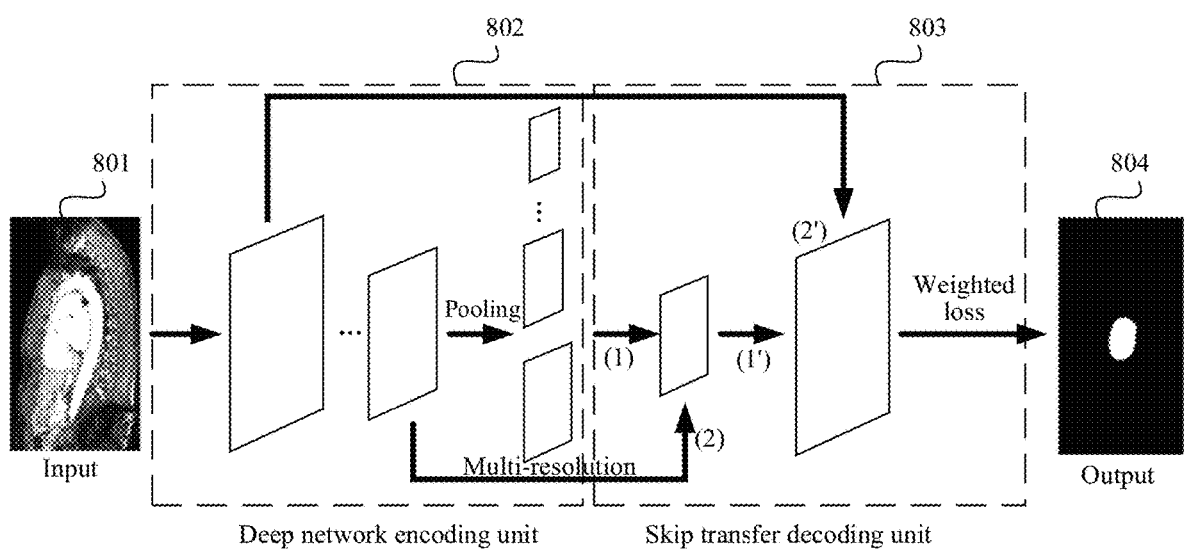
FIG. 8 is a schematic structural diagram of a first segmentation model according to another exemplary embodiment of the present disclosure.

For example, as shown in FIG. 8, the computer device inputs obtained two-dimensional slice image(s) 801 of the x axis into a deep network encoding unit 802 constructed based on a ResNet101 model. The deep network encoding unit 802 includes five convolutional layers, and the five convolutional layers are respectively Conv1, Conv2_x, Conv3_x, Conv4_x, and Conv5_x. Information about a size of a convolution kernel and a quantity of convolution kernels corresponding to each convolutional layer, and a stride through which a convolution kernel performs convolution each time is shown in Table 1. x in the table represents a convolutional sublayer number belonging to the convolutional layer.

TABLE 1

| Name of convolutional layer | ResNet101 | |
|---|---|---|
| Conv1 | 7 × 7, 64, and stride 2 | |
| Conv2_x | 3 × 3, max pool, and stride 2 | |
| | 1 × 1, and 64 | x3 blocks |
| | 3 × 3, and 64 | |
| | 1 × 1, and 256 | |
| Conv3_x | 1 × 1, and 128 | x4 blocks |
| | 3 × 3, and 128 | |
| | 1 × 1, and 512 | |
| Conv4_x | 1 × 1, and 256 | x23 blocks |
| | 3 × 3, and 256 | |
| | 1 × 1, and 1024 | |
| Conv5_x | 1 × 1, and 512 | x3 blocks |
| | 3 × 3, and 512 | |
| | 1 × 1, and 2048 | |

Figure 9:
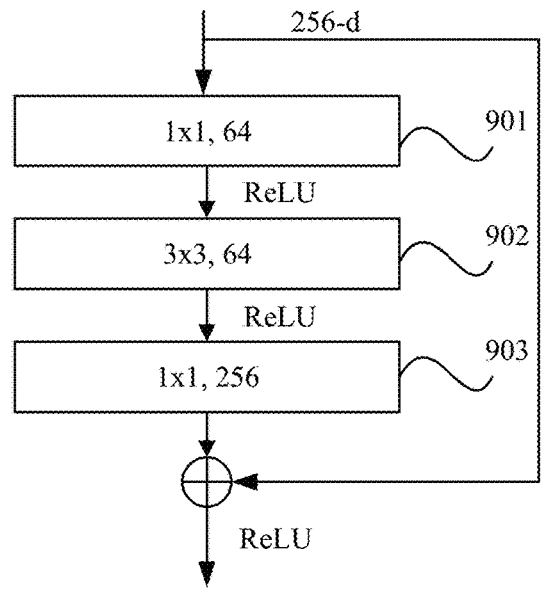
FIG. 9 is a schematic structural diagram of a first block in a ResNet101 network model according to another exemplary embodiment of the present disclosure.

As shown in Table 1, the Conv1 layer of the deep network encoding unit 802 includes 64 7×7 convolution kernels, and each time of convolution has a stride of 2. Conv2_x includes one convolutional sublayer and three first blocks that are cascaded. The first convolutional sublayer includes a 3×3 convolution kernel, each time of convolution has a stride of 2, and max pooling is performed once after the convolution of the first convolutional sublayer. The three first blocks located behind the first convolutional sublayer are the same. As shown in FIG. 9, the first block includes three convolutional sublayers. A first convolutional sublayer 901 includes 64 1×1 convolution kernels, a second convolutional sublayer 902 includes 64 3×3 convolution kernels, a third convolutional sublayer 903 includes 256 1×1 convolution kernels, and an activation layer, e.g., a rectified linear unit (ReLU) layer, and a batch normalization (BN) layer (not shown in the figure) are connected behind each convolutional sublayer. In addition, the first block is further used for mapping, through a skip connection, pixels corresponding to a feature map outputted by the first convolutional sublayer of a previous layer to a feature map outputted by the third convolutional sublayer 903, and perform activation through the ReLU layer, to obtain a feature map of an input of a next block. The ReLU layer is used for converting linear data obtained after the convolution into non-linear data, thereby improving an expression capability of the ResNet101 model. The BN layer is used for accelerating a convergence speed of the ResNet101 model, and a gradient diffusion problem of the ResNet101 model having deep layers is alleviated, so that the ResNet101 model is more stable and easier to be trained.

Conv3_x includes four cascaded second blocks, and the four second blocks are the same. The second block has the same structure as the first block, and the second block may be understood with reference to the structure of the first block. The second block includes three convolutional sublayers. A fourth convolutional sublayer includes 128 1×1 convolution kernels, and each time of convolution has a stride of 2. A fifth convolutional sublayer includes 128 3×3 convolution kernels, a sixth convolutional sublayer includes 512 1×1 convolution kernels, and a ReLU layer and a BN layer are connected behind each convolutional sublayer. In addition, the second block is further used for mapping, through a skip connection, pixels corresponding to a feature map outputted by a previous block to a feature map outputted by the sixth convolutional sublayer, and perform activation through the ReLU layer, to obtain a feature map of an input of a next block.

Conv4_x includes 23 cascaded third blocks, and the 23 third blocks are the same. The third block has the same structure as the first block, and the third block may be understood with reference to the structure of the first block. The third block includes three convolutional sublayers. A seventh convolutional sublayer includes 256 1×1 convolution kernels, and each time of convolution has a stride of 1. To ensure that an area (also referred to as a receptive field) of a feature map outputted by each layer behind the seventh convolutional sublayer is not reduced, a stride of atrous convolution is set to 2. An eighth convolutional sublayer includes 256 3×3 convolution kernels, a ninth convolutional sublayer includes 1024 1×1 convolution kernels, and a ReLU layer and a BN layer are connected behind each convolutional sublayer. In addition, the third block is further used for mapping, through a skip connection, pixels corresponding to a feature map outputted by a previous block to a feature map outputted by the ninth convolutional sublayer, and perform activation through the ReLU layer, to obtain a feature map of an input of a next block.

The atrous convolution, also referred to as dilated convolution, is a convolution manner of injecting holes between convolution kernels. Compared to common convolution, the atrous convolution introduces a hyperparameter referred to as "dilation rate". The parameter defines a spacing between values when convolution kernels process data. Through atrous convolution processing, on one hand, a spatial scale of an image feature can be unchanged, thereby avoiding an information loss caused by reduction of information about pixels of the image feature; on the other hand, the receptive field can be expanded, thereby implementing more precise target detection. The receptive field is a region that a pixel located on a feature map outputted by a hidden layer in a neural network maps on an original image. A larger receptive field of the pixel on the original image indicates a larger range that the pixel maps on the original image and a more global feature with a higher semantic level.

Conv5_x includes three cascaded fourth blocks, and the three fourth blocks are the same. The fourth block has the same structure as the first block, and the fourth block may be understood with reference to the structure of the first block. The fourth block includes three convolutional sublayers. A tenth convolutional sublayer includes 512 1×1 convolution kernels, an eleventh convolutional sublayer includes 512 3×3 convolution kernels, a twelfth convolutional sublayer includes 2048 1×1 convolution kernels, and a ReLU layer and a BN layer are connected behind each convolutional sublayer. In addition, the fourth block is further used for mapping, through a skip connection, pixels corresponding to a feature map outputted by a previous block to a feature map outputted by the twelfth convolutional sublayer, and perform activation through the ReLU layer, to obtain a feature map of an input of a next block.

After features of the two-dimensional slice image 801 of the x axis are extracted through the five convolutional layers of the deep network encoding unit 802, a first intermediate feature map (1) is obtained, and the first intermediate feature map (1) corresponds to an x-axis directional plane. For example, the first intermediate feature map (1) is a feature map obtained after 8-fold down-sampling. In some embodiments, down-sampling is performed through pooling after Conv5_x. Given that a case of a huge scale range distribution difference easily occurs when a 3D image is segmented into slice images, multi-scale or multi-resolution information needs to be added, and a size of a kernel for down-sampling is set to five types, namely, 1, 9, 19, 37, and 74.

For example, the computer device then inputs the first intermediate feature map (1) into a skip transfer decoding unit 803. The skip transfer decoding unit 803 includes two deconvolution layers. The computer device encodes the first intermediate feature map (1) in a stepwise manner through the deconvolution layer, a quantity of times of encoding is 2, and a multiple of encoding each time is 2. Encoding the first intermediate feature map (1) refers to performing skip connection and up-sampling processing on the first intermediate feature map (1) and a feature map outputted by a pre-determined layer in the deep network encoding unit 802. In a first deconvolution layer, a skip connection and 2-fold up-sampling processing are performed on the first intermediate feature map (1) and a second intermediate feature map (2) outputted by the Conv3_x convolutional layer of the deep network encoding unit 802, to obtain a 2-fold up-sampled first intermediate feature map (1'), and a skip connection and 2-fold up-sampling processing are performed on the up-sampled first intermediate feature map (1') and a second intermediate feature map (2') outputted by the Conv1 convolutional layer of the deep network encoding unit 802, to obtain a 4-fold up-sampled second intermediate feature map (2'), and obtain a final distribution probability map. In some embodiments, sizes of the first intermediate feature map and the second intermediate feature map that are in a skip connection are the same.

The computer device obtains a distribution probability map 804 of the target organ on the x-axis directional plane by using the first segmentation model. The distribution probability map 804 indicates a probability that each pixel on the two-dimensional slice image belongs to a foreground region and/or a probability that each pixel on the two-dimensional slice image belongs to a background region. The foreground region is a region in which the target organ is located, and the background region is a region without the target organ.

Step 505. The terminal invokes a second segmentation model to perform semantic segmentation on the two-dimensional slice images of the y axis, to obtain a distribution probability map of the target organ on a y-axis directional plane.

In some embodiments, the second segmentation model and the first segmentation model have the same structure, and a difference only lies in a sample image used in the training process. Therefore, for a process of performing semantic segmentation on the two-dimensional slice images of the y axis by using the second segmentation model, reference may be made to the description of step 504, and details are not described again.

Step 506. The terminal invokes a third segmentation model to perform semantic segmentation on the two-dimensional slice images of the z axis, to obtain a distribution probability map of the target organ on a z-axis directional plane.

In some embodiments, the third segmentation model and the first segmentation model have the same structure, and a difference only lies in a sample image used in the training process. Therefore, for a process of performing semantic segmentation on the two-dimensional slice images of the y axis by using the second segmentation model, reference may be made to the description of step 504, and details are not described again.

Step 507. The terminal invokes an adaptive fusion model to combine the three distribution probability maps respectively corresponding to the x-axis directional plane, the y-axis directional plane, and the z-axis directional plane, to obtain a three-dimensional distribution feature map.

The computer device invokes an adaptive fusion model stored in the memory to combine the three distribution probability maps respectively corresponding to the x-axis directional plane, the y-axis directional plane, and the z-axis directional plane, to obtain a three-dimensional distribution feature map.

Figure 10:
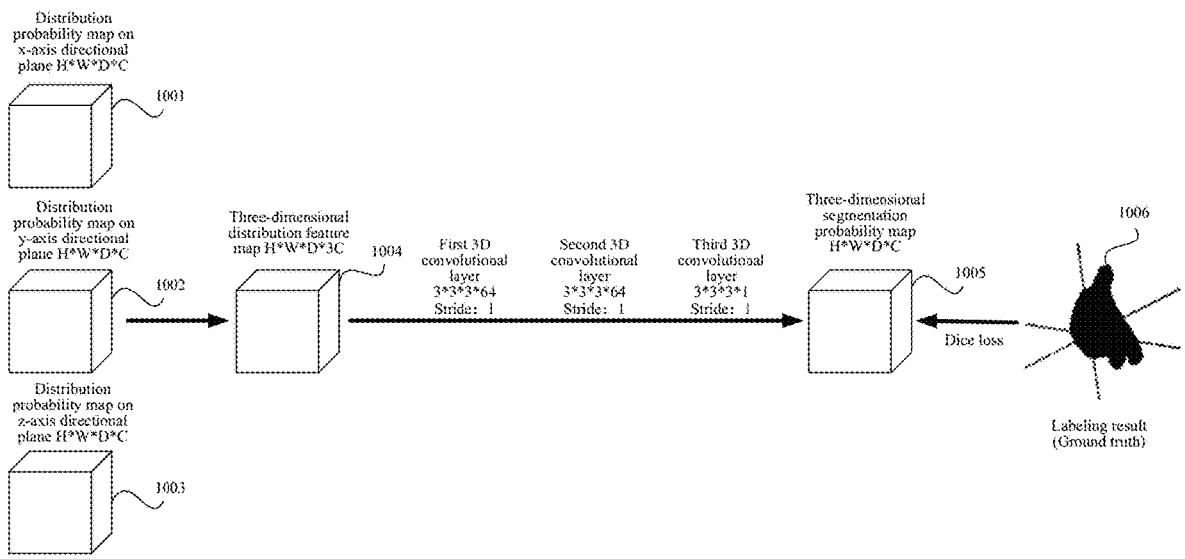
FIG. 10 is a schematic structural diagram of an adaptive fusion model according to another exemplary embodiment of the present disclosure.

As shown in FIG. 10, the computer device performs three-dimensional fusion on a distribution probability map 1001 of the target organ on the x-axis directional plane, a distribution probability map 1002 of the target organ on the y-axis directional plane, and a distribution probability map 1003 of the target organ on the z-axis directional plane that are obtained, to obtain a three-dimensional distribution feature map 1004. The distribution probability maps 1001 to 1003 on the three directional planes have the same size as the three-dimensional medical image, and have probabilities corresponding to respective directional planes. The three-dimensional distribution feature map 1004 includes probabilities that correspond to the target organ and that respectively correspond to the three directional planes, and a size of the three-dimensional distribution feature map 1004 is the same as a size of the three-dimensional medical image.

Step 508. The terminal performs three-dimensional fusion convolution on the three-dimensional distribution feature map, to obtain a three-dimensional segmentation probability map.

The computer device invokes the adaptive fusion model (e.g., a three-convolution-layer model) stored in the memory to perform three-dimensional fusion convolution on the obtained three-dimensional distribution feature map 1004, to obtain a three-dimensional segmentation probability map 1005. The three-dimensional segmentation probability map 1005 is used for indicating a probability that each pixel in the three-dimensional medical image belongs to a foreground region and/or a probability that each pixel in the three-dimensional medical image belongs to a background region. The foreground region is a region in which the target organ is located, and the background region is a region without the target organ. In FIG. 10, H*W*D*C indicates a size and a corresponding probability of an image.

In some embodiments, the adaptive fusion model includes three shallow 3D convolutional layers. A first 3D convolutional layer includes 64 3*3*3 3D convolution kernels and a convolution stride is 1. A second 3D convolutional layer includes 64 3*3*3 3D convolution kernels and a convolution stride is 1. A third 3D convolutional layer includes one 3*3*3 3D convolution kernels and a convolution stride is 1.

In some embodiments, a size of the three-dimensional segmentation probability map 1005 is the same as the size of the three-dimensional medical image.

Step 509. The terminal obtains a three-dimensional distribution binary image of the target organ through calculation according to a maximum probability category of each pixel in the three-dimensional segmentation probability map.

In some embodiments, the adaptive fusion model determines a category of each pixel in the image according to a maximum probability category of the each pixel in the three-dimensional segmentation probability map. The category includes a foreground pixel belonging to the target organ and a background pixel that does not belongs to the target organ.

In some embodiments, the three-dimensional segmentation probability map 1005 includes a first probability that each pixel belongs to the foreground pixel and a second probability that each pixel belongs to the background pixel, and the maximum probability category is a category corresponding to a lager probability between the first probability and the second probability. For example, if a probability that a pixel belongs to the foreground pixel is 80%, and a probability that the pixel belongs to the background pixel is 20%, a maximum probability category of the pixel is the foreground pixel. In some embodiments, in the three-dimensional distribution binary image, the foreground pixel is represented by 1, and the background pixel is represented by 0.

Step 510. The terminal performs filtering processing on noise pixels in the three-dimensional distribution binary image based on clinical prior knowledge.

Because a distribution location of each type of target organ in the three-dimensional medical image is relatively fixed, the computer device may further filter out noise pixels in the three-dimensional distribution binary image by using clinical prior knowledge.

First, the computer device filters out first noise pixels exceeding a target value range in the three-dimensional distribution binary image.

The target value range is a coordinate value range in which the target organ possibly appears and that is obtained according to first clinical prior knowledge. In some embodiments, the target value range is a three-dimensional cubic box region. The first clinical prior knowledge may be constructed based on a plurality of sample images.

Second, the computer device filters out second noise pixels outside a three-dimensional ellipsoidal model in the three-dimensional distribution binary image.

The three-dimensional ellipsoidal model is an ellipsoidal model that corresponds to the target organ and that is obtained according to second clinical prior knowledge. The second clinical prior knowledge may be constructed based on a plurality of sample images. Because shapes of most organs are inclined to be ellipsoids, the terminal may obtain, through statistics in advance, longest axes and shortest axes of the target organ on the two-dimensional slice images on the x-axis, y-axis, and z-axis directional planes, to construct the three-dimensional ellipsoidal model of the target organ. Noise pixels outside the three-dimensional ellipsoidal model is filtered out from candidate pixels according to the constructed three-dimensional ellipsoidal model.

In some embodiments, a method for the computer device filtering out noise pixels may be at least one of the foregoing two filtering manners.

In conclusion, in the method provided in some embodiments, slicing is performed on an obtained three-dimensional image according to the three directional planes in which three-dimensional coordinate axes are located, to obtain two-dimensional slice images corresponding to three directional planes, and then two-dimensional distribution probability maps corresponding to the three directional planes are obtained by using three segmentation models corresponding to the three directional planes, so that a terminal implements two-dimensional semantic segmentation on a three-dimensional medical image. Then, three-dimensional fusion is performed on the three distribution probability maps by using an adaptive fusion model, to obtain a three-dimensional distribution binary image of the target object, so that the problem in the related art that the Pspnet network model is only applicable to semantic segmentation on a 2D natural image, and cannot perform semantic segmentation on a 3D medical image is resolved. Therefore, semantic segmentation can be performed on the 3D medical image by using three 2D segmentation models and one adaptive fusion model, and because the adaptive fusion model fuses two-dimensional distribution probability maps in three different dimensions, background noise is effectively suppressed during three-dimensional fusion, so that edges of the target object are smoothly and accurately segmented.

In the method provided in some embodiments, filtering processing is performed on noise pixels by using clinical prior knowledge, and the terminal obtains pixels belonging to the target organ, which has a relatively strong noise-reduction capability and a good edge segmentation effect.

In the method provided in some embodiments, a size of a two-dimensional slice image is changed from an original size to an input size, avoiding a problem that an error may be produced when the original size of the two-dimensional slice image is used, so that when semantic segmentation is performed on a three-dimensional medical image, a target organ can be accurately segmented. In actual application, determining of automatic lesion of a plurality of types of organs or tissues related to shapes can be implemented, thereby achieving an objective of assisting in diagnosis.

Figure 11:
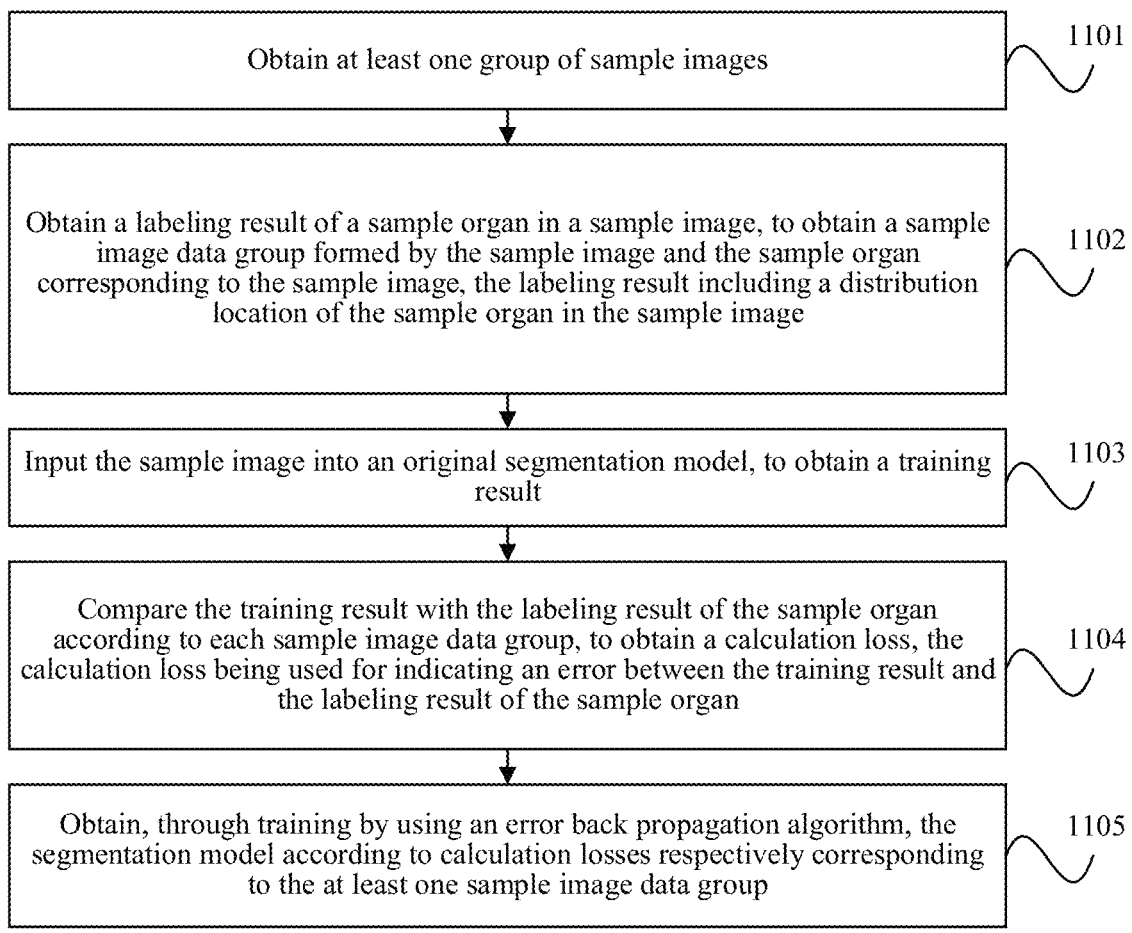
FIG. 11 is a flowchart of a convolutional network model training method according to an exemplary embodiment of the present disclosure.

In some embodiments, the first segmentation model, the second segmentation model, the third segmentation model, and the adaptive fusion model all belong to a convolutional network model. Before the convolutional network model is invoked, the computer device further needs to train the convolutional network model. As shown in FIG. 11, a method for training the three two-dimensional segmentation models includes, but is not limited to, the following steps:

Step 1101. The terminal obtains at least one group of sample images.

The computer device acquires at least one group of sample images by using a medical image acquisition device, and a quantity of sample images in each group is not limited, and may be set according to requirements of a trainer. The sample image may include an image having a sample organ and an image having no sample organ. For a sample image having a sample organ, pixels belonging to the sample organ are labeled in the sample image.

For a first segmentation model, the sample image may be two-dimensional slice images on an x-axis directional plane, and pixels belonging to the sample organ are labeled on the two-dimensional slice images on the x-axis directional plane.

For a second segmentation model, the sample image may be two-dimensional slice images on a y-axis directional plane, and pixels belonging to the sample organ are labeled on the two-dimensional slice images on the y-axis directional plane.

For a third segmentation model, the sample image may be two-dimensional slice images on a z-axis directional plane, and pixels belonging to the sample organ are labeled on the two-dimensional slice images on the z-axis directional plane.

Step 1102. The terminal obtains a labeling result of a sample organ in a sample image, to obtain a sample image data group formed by the sample image and the sample organ corresponding to the sample image, the labeling result including a distribution location of the sample organ in the sample image. The labeling result may also be referred as ground truth.

After the computer device obtains the sample image, the trainer or the computer device sets a labeling result for the sample image, the labeling result including pixels belonging to the sample organ. The labeling result is used for indicating at least one type of information about a distribution location of the sample organ in the sample image, a size of the sample organ, and an ellipsoidal shape corresponding to the sample organ.

For example, a region in which a sample organ is located and a background region other than the sample organ are labeled in an image having a sample organ, and a region in which there is no sample organ is labeled in an image without a sample organ.

The sample image data group is used for being compared with a training result corresponding to the sample image.

Step 1103. The terminal inputs the sample image into an original segmentation model, to obtain a training result.

The computer device inputs the same group of labeled sample images into an original segmentation model, performs recognition on the sample images and sample organs in the sample images by using the original segmentation model, and uses a recognition result as a training result for output.

In some embodiments, the original segmentation model is a model constructed based on a ResNet model, as shown in FIG. 8. An initial weight of the segmentation model may be set by the trainer according to empirical values, or may be randomly set by the computer device. In a possible embodiment, a weight of a deep network encoding unit in the segmentation model may be initialized by using a ResNet parameter trained through an ImageNet dataset, and a weight of a skip transfer decoding unit is initialized by using a Gaussian distribution value that has a mean value of 0 and that divides a variance of 2 by an input quantity.

Step 1104. The terminal compares the training result with the labeling result of the sample organ according to each sample image data group, to obtain a calculation loss, the calculation loss being used for indicating an error between the training result and the labeling result of the sample organ.

The computer device compares the obtained training result with a sample image data group corresponding to the same group of sample images, to calculate an error between the training result and the labeling result. In some embodiments, the error is a weighted loss function. The calculation loss is used for indicating an error between the training result and the labeling result of the sample organ. The weighted loss function uses a cross entropy loss function, and a weighted loss formula of the cross entropy loss function is:

$$(w_{fg} y \log(p) + w_{wg}(1-y)\log(1-p)), w_{fg} = \frac{1}{N}\sum_{i=1}^{N}\frac{t_i}{n_i}, w_{bg} = 1 - w_{fg},$$

where p represents a probability that the pixel belongs to target pixels corresponding to a target organ, y represents a category, that is, y is 0 or 1, $w_{fg}$ represent a weight of a foreground category, $w_{wg}$ represents a weight of a background category, $t_i$ represents a quantity of pixels in the foreground of an $i^{th}$ sample image, $n_i$ represents a quantity of pixels in the entire $i^{th}$ sample image, N is a quantity of sample images of a batch size, and a weighted value is obtained by collecting statistics on a ratio of the foreground to the background in an sample image.

Step 1105. The terminal obtains, through training by using an error back propagation algorithm, the segmentation model according to calculation losses respectively corresponding to the at least one sample image data group.

The terminal resets a weight by using an error back propagation algorithm according to calculation losses respectively corresponding to the at least one sample image data group, until a weighted loss obtained by the terminal according to the reset weight meets a preset threshold, or a quantity of times of training by the terminal reaches a preset quantity of times. For example, it is required that the terminal may stop training when the quantity of times of training reaches 20000. In this case, training of the segmentation model used for performing two-dimensional semantic segmentation is complete. In some embodiments, the error back propagation algorithm may use a gradient descent method based on stochastic gradient descent (SGD). A convolutional template parameter w and a bias parameter b of the segmentation model are resolved according to the gradient descent method based on SGD, and a training iteration parameter may be selected according to cross verification.

After training of the segmentation models respectively corresponding to the three coordinate axes are complete, two-dimensional distribution probability maps are obtained in the trained segmentation models according to two-dimensional slice images of each three-dimensional sample image. The two-dimensional distribution probability maps and labeled three-dimensional binary maps are used as another sample image data group. The adaptive fusion model is trained by using the sample image data group, and a training process of the adaptive fusion model is the same as or similar to the foregoing method. Details are not described in the present disclosure.

In some embodiments, a weighted loss is obtained by calculating a probability that each pixel in a feature map belongs to a target pixel. The target pixel is a pixel corresponding to each feature of the target organ.

The training process of the adaptive fusion model is the same as the training processes of the three segmentation models, and the training process of the adaptive fusion model may be implemented with reference to the steps shown in FIG. 11. After obtaining a training result, the adaptive fusion model uses a dice loss function as a loss function. The dice loss function is used for calculating an error between the training result (e.g., three-dimensional segmentation probability map 1005) of the adaptive fusion model and a labeling result (e.g., ground truth 1006) of the adaptive fusion model.

The semantic segmentation method for a three-dimensional image provided in the present disclosure may also be applied to a semantic segmentation method for a two-dimensional image.

Figure 12:
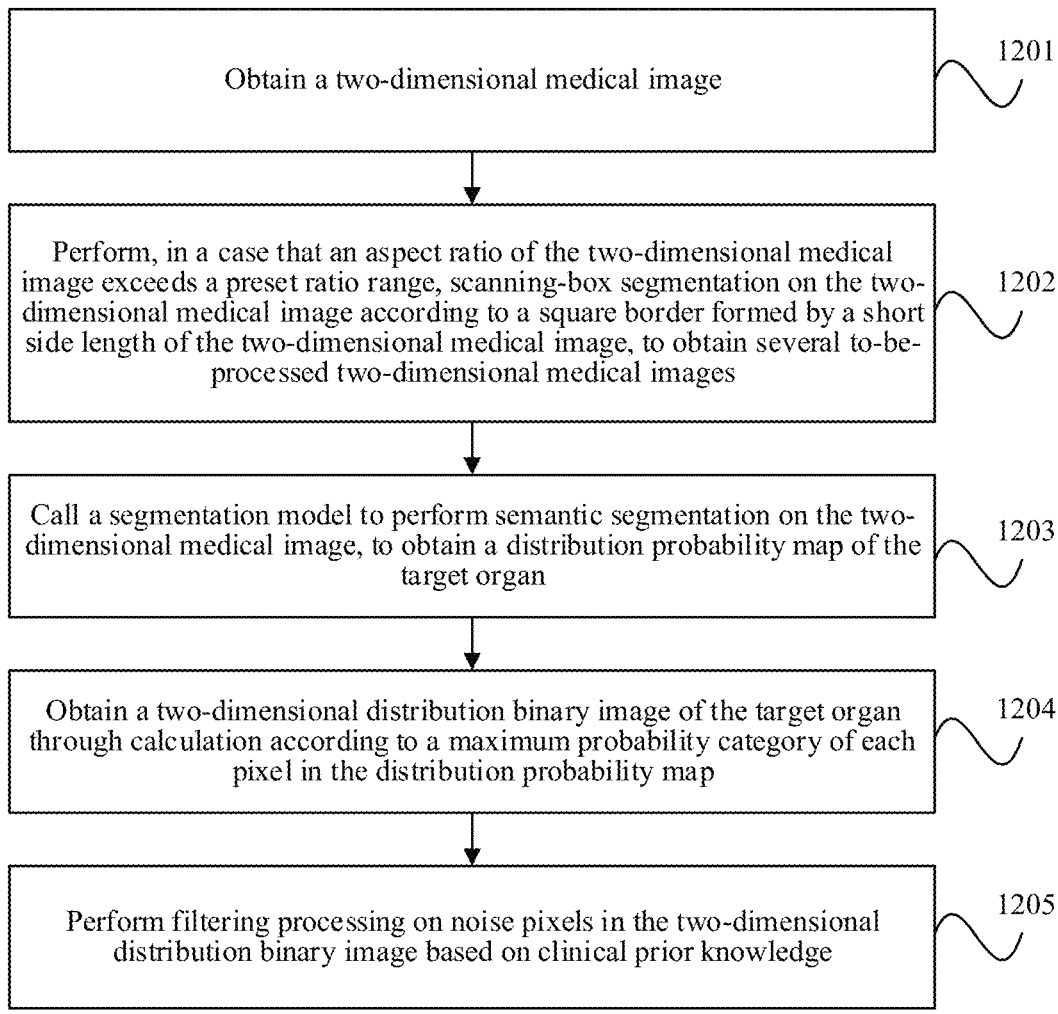
FIG. 12 is a flowchart of a semantic segmentation method for a two-dimensional image according to another exemplary embodiment of the present disclosure.

FIG. 12 is a flowchart of a semantic segmentation method for a two-dimensional image according to another exemplary embodiment of the present disclosure. The method may be applied to the implementation environment shown in FIG. 2. In some embodiments, description is made by using an example in which the two-dimensional image is a two-dimensional medical image and the target object is a target organ. The method includes the following steps:

Step 1201. A terminal obtains a two-dimensional medical image.

The computer device acquires a two-dimensional medical image by using a medical image acquisition device, and the two-dimensional medical image includes a two-dimensional target organ, and a background region other than the target organ.

The computer device performs analysis after obtaining the two-dimensional medical image. In some embodiments, because a distribution location of each type of target organ in the two-dimensional medical image is relatively fixed, the computer device further reads pre-stored third clinical prior knowledge, the third clinical prior knowledge being used for indicating a target value range of a candidate appearing location of the target organ in each two-dimensional medical image. For example, a transverse coordinate range of a candidate appearing location of a target organ A in a two-dimensional medical image of an x axis is [a1, a2], and a longitudinal coordinate range of a candidate appearing location of the target organ A in a two-dimensional medical image of a y axis is [b1, b2]. The target value range is used for performing third noise filtering in a post-processing process.

Step 1202. The terminal performs, when an aspect ratio of the two-dimensional medical image exceeds a preset ratio range, scanning-box segmentation on the two-dimensional medical image according to a square border formed by a short side length of the two-dimensional medical image, to obtain several to-be-processed two-dimensional medical images.

Because sizes of inputted images of segmentation models corresponding to the two coordinate axes are generally a square size, and in some implementations, the two-dimensional medical image is extremely long and narrow, the target organ is severely deformed after the long and narrow two-dimensional medical image is directly converted into an image of the square size, resulting in a failure in semantic segmentation. Therefore, the computer device may further process the two-dimensional medical image in the following image pre-processing manner.

In some embodiments, when an aspect ratio of an obtained two-dimensional medical image is within a preset ratio range, the computer device converts a size of the two-dimensional medical image into an input size that meets a segmentation model. The preset ratio range may be [⅓, 3].

In some embodiments, as shown in FIG. 6, when an aspect ratio of an obtained two-dimensional medical image exceeds the preset ratio range, that is, the aspect ratio of the two-dimensional medical image exceeds [⅓, 3], it is considered that the two-dimensional medical image is extremely long and narrow. If the computer device directly converts an original size of the two-dimensional medical image into an input size, and the input size is a size meeting a pixel size of a segmentation model, a target organ in the two-dimensional medical image is squeezed into a bar, resulting in an inaccurate final prediction result.

In this case, as shown in FIG. 7, the computer device performs scanning-box segmentation on the two-dimensional medical image according to a square border formed by a short side length of the two-dimensional medical image, to obtain several to-be-processed two-dimensional medical images. Then, the computer device converts sizes of the several to-be-processed two-dimensional medical images into an input size of a segmentation model, and respectively inputs the several to-be-processed two-dimensional medical images into the segmentation model for prediction.

Step 1203. The terminal invokes a segmentation model to perform semantic segmentation on the two-dimensional medical image, to obtain a distribution probability map of the target organ.

A structure of the segmentation model is the same as the structure of the first segmentation model. Therefore, for the structure of the segmentation model, reference may be made to the structure of the model shown in FIG. 8. The segmentation model includes: a deep network encoding unit and a skip transfer decoding unit, the deep network encoding unit including n convolutional layers, and the skip transfer decoding unit including m deconvolution layers, both n and m being a positive integer.

The deep network encoding unit is configured to perform, by the terminal, down-sampling feature extraction on a two-dimensional image through the n convolutional layers, to obtain a down-sampled third intermediate feature map.

The skip transfer decoding unit is configured to perform, by the terminal, up-sampling processing on the third intermediate feature map and a fourth intermediate feature map through the m deconvolution layers, to obtain an up-sampled distribution probability map.

The fourth intermediate feature map includes a feature map outputted by an $i^{th}$ convolutional layer of the n convolutional layers, i being an integer less than or equal to n.

In some embodiments, the segmentation model and the first segmentation model have the same structure, and a difference only lies in a sample image used in the training process. Therefore, for a process of performing semantic segmentation on the two-dimensional medical image by using the segmentation model, reference may be made to the description of step 504, and details are not described again.

Step 1204. The terminal obtains a two-dimensional distribution binary image of the target organ through calculation according to a maximum probability category of each pixel in the distribution probability map.

In some embodiments, the segmentation model determines a category of each pixel in the image according to a maximum probability category of each pixel in the distribution probability map. The category includes a foreground pixel belonging to the target organ and a background pixel that does not belongs to the target organ.

In some embodiments, the distribution probability map includes a third probability that each pixel belongs to the foreground pixel and a fourth probability that each pixel belongs to the background pixel, and the maximum probability category is a category corresponding to a lager probability between the third probability and the fourth probability. For example, if a probability that a pixel belongs to the foreground pixel is 80%, and a probability that the pixel belongs to the background pixel is 20%, a maximum probability category of the pixel is the foreground pixel. In some embodiments, in the two-dimensional distribution binary image, the foreground pixel is represented by 1, and the background pixel is represented by 0.

Step 1205. The terminal performs filtering processing on noise pixels in the two-dimensional distribution binary image based on clinical prior knowledge.

Because a distribution location of each type of target organ in the two-dimensional medical image is relatively fixed, the computer device may further filter out noise pixels in the two-dimensional distribution binary image by using clinical prior knowledge.

The computer device filters out third noise pixels exceeding a target value range in the two-dimensional distribution binary image.

The target value range is a coordinate value range in which the target organ possibly appears and that is obtained according to third clinical prior knowledge. In some embodiments, the target value range is a two-dimensional planar box region. The third clinical prior knowledge may be constructed based on a plurality of sample images.

In conclusion, in the method provided in some embodiments, a distribution probability map of a target organ is obtained by performing semantic segmentation on an obtained two-dimensional image through a segmentation model, a two-dimensional distribution binary image of the target organ is obtained by determining a maximum probability category of each pixel in the distribution probability map, and an objective of performing semantic segmentation on the two-dimensional image is achieved by filtering out noise pixels from the obtained two-dimensional distribution binary image according to third clinical prior knowledge. In addition, by filtering out the noise pixels, an image segmentation edge after the semantic segmentation is clear, and edge processing is friendly. Moreover, it is proved that the semantic segmentation method for a three-dimensional image is not only applicable to semantic segmentation for a three-dimensional image, but also applicable to semantic segmentation for a two-dimensional image, and segmentation effects are relatively excellent.

It is to be understood that, the steps of the embodiments of the present disclosure are not necessarily performed according to a sequence indicated by step numbers. Unless otherwise explicitly specified in the present disclosure, execution of the steps is not strictly limited, and the steps may be performed in other orders. Moreover, at least some of the steps in the embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

In an embodiment, a terminal is further provided. The terminal includes a semantic segmentation apparatus for a three-dimensional image and a semantic segmentation apparatus for a two-dimensional image. The semantic segmentation apparatus for a three-dimensional image and the semantic segmentation apparatus for a two-dimensional image includes various modules, and each module may be entirely or partially implemented by using software, hardware, or a combination thereof.

The following is apparatus embodiments of the present disclosure that can be used for performing the method embodiments of the present disclosure. For details not disclosed in the apparatus embodiments of the present disclosure, refer to the method embodiments of the present disclosure.

Figure 13:
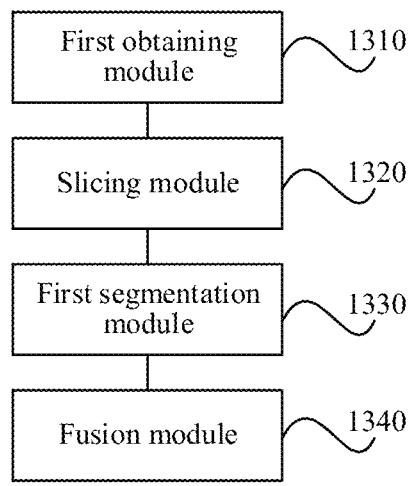
FIG. 13 is a schematic diagram of a semantic segmentation apparatus for a three-dimensional image according to an exemplary embodiment of the present disclosure.

FIG. 13 is a schematic diagram of a semantic segmentation apparatus for a three-dimensional image according to an exemplary embodiment of the present disclosure. The apparatus includes:

a first obtaining module 1310, configured to obtain a three-dimensional image;

a slicing module 1320, configured to slice the three-dimensional image according to three directional planes in which three-dimensional coordinate axes are located, to obtain two-dimensional slice images of an x axis, two-dimensional slice images of a y axis, and two-dimensional slice images of a z axis;

a first segmentation module 1330, configured to invoke a first segmentation model to perform semantic segmentation on the two-dimensional slice images of the x axis, to obtain a distribution probability map of a target object on an x-axis directional plane; invoke a second segmentation model to perform semantic segmentation on the two-dimensional slice images of the y axis, to obtain a distribution probability map of the target object on a y-axis directional plane; invoke a third segmentation model to perform semantic segmentation on the two-dimensional slice images of the z axis, to obtain a distribution probability map of the target object on a z-axis directional plane; and a fusion module 1340, configured to invoke an adaptive fusion model to perform three-dimensional fusion on the three distribution probability maps respectively corresponding to the x-axis directional plane, the y-axis directional plane, and the z-axis directional plane, to obtain a three-dimensional distribution binary image of the target object.

Figure 14:
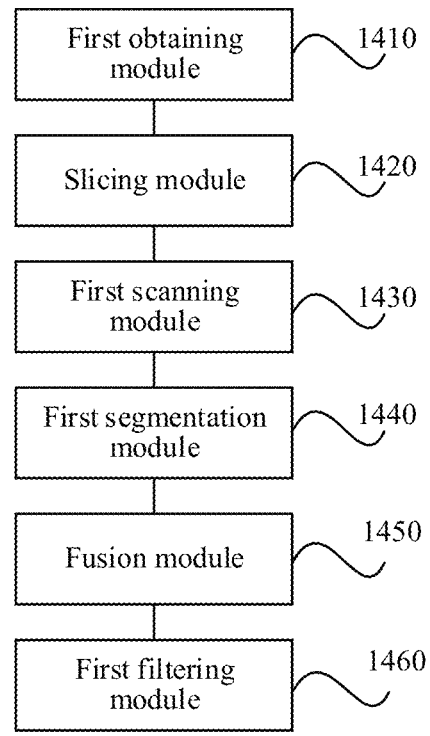
FIG. 14 is a schematic diagram of a semantic segmentation apparatus for a three-dimensional image according to another exemplary embodiment of the present disclosure.

FIG. 14 is a schematic diagram of a semantic segmentation apparatus for a three-dimensional image according to another exemplary embodiment of the present disclosure. The apparatus includes: a first obtaining module 1410, a slicing module 1420, a first scanning module 1430, a first segmentation module 1440, and a fusion module 1450.

The first obtaining module 1410 is configured to obtain a three-dimensional image.

The slicing module 1420 is configured to slice the three-dimensional image according to three directional planes in which three-dimensional coordinate axes are located, to obtain two-dimensional slice images of an x axis, two-dimensional slice images of a y axis, and two-dimensional slice images of a z axis.

The first scanning module 1430 is configured to perform, when an aspect ratio of a two-dimensional slice image exceeds a preset ratio range, scanning-box segmentation on the two-dimensional slice image according to a square border formed by a short side length of the two-dimensional slice image, to obtain several to-be-processed two-dimensional slice images.

The first segmentation module 1440 is configured to invoke a first segmentation model to perform semantic segmentation on the two-dimensional slice images of the x axis, to obtain a distribution probability map of a target object on an x-axis directional plane; invoke a second segmentation model to perform semantic segmentation on the two-dimensional slice images of the y axis, to obtain a distribution probability map of the target object on a y-axis directional plane; invoke a third segmentation model to perform semantic segmentation on the two-dimensional slice images of the z axis, to obtain a distribution probability map of the target object on a z-axis directional plane.

In some embodiments, at least one model of the first segmentation model, the second segmentation model, and the third segmentation model includes: a deep network encoding unit and a skip transfer decoding unit, the deep network encoding unit including n convolutional layers, and the skip transfer decoding unit including m deconvolution layers, both n and m being a positive integer.

The deep network encoding unit is configured to perform down-sampling feature extraction on a two-dimensional slice image through the n convolutional layers, to obtain a down-sampled first intermediate feature map.

The skip transfer decoding unit is configured to perform up-sampling processing on the first intermediate feature map and a second intermediate feature map through the m deconvolution layers, to obtain an up-sampled distribution probability map.

The second intermediate feature map includes a feature map outputted by an $i^{th}$ convolutional layer of the n convolutional layers, i being an integer less than or equal to n.

The fusion module 1450 is configured to invoke an adaptive fusion model to perform three-dimensional fusion on the three distribution probability maps respectively corresponding to the x-axis directional plane, the y-axis directional plane, and the z-axis directional plane, to obtain a three-dimensional distribution binary image of the target object.

Figure 15:
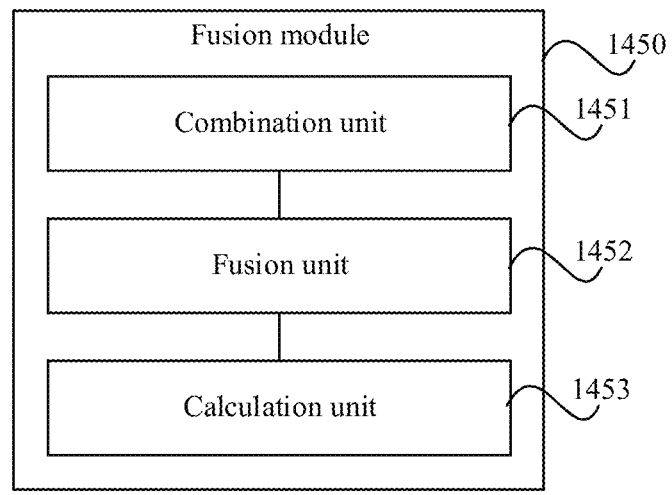
FIG. 15 is a schematic diagram of a fusion module according to another exemplary embodiment of the present disclosure.

In some embodiments, as shown in FIG. 15, the fusion module 1450 includes:
- a combination unit 1451, configured to invoke the adaptive fusion model to combine the three distribution probability maps respectively corresponding to the x-axis directional plane, the y-axis directional plane, and the z-axis directional plane, to obtain a three-dimensional distribution feature map;
- a fusion unit 1452, configured to perform three-dimensional fusion convolution on the three-dimensional distribution feature map, to obtain a three-dimensional segmentation probability map; and
- a calculation unit 1453, configured to obtain the three-dimensional distribution binary image of the target object through calculation according to a maximum probability category of each pixel in the three-dimensional segmentation probability map.

In some embodiments, the three-dimensional image is a three-dimensional medical image, and the apparatus further includes:
- a first filtering module 1460, configured to filter out noise pixels in the three-dimensional distribution binary image based on clinical prior knowledge.

The clinical prior knowledge is knowledge obtained by collecting statistics on a distribution location of the target object in the three-dimensional medical image.

In some embodiments, the first filtering module 1460 is configured to filter out first noise pixels exceeding a target value range in the three-dimensional distribution binary image.

The target value range is a coordinate value range corresponding to appearance locations of the target object obtained according to first clinical prior knowledge.

In some embodiments, the first filtering module 1460 is configured to filter out second noise pixels outside a three-dimensional ellipsoidal model in the three-dimensional distribution binary image.

The three-dimensional ellipsoidal model is an ellipsoidal model that corresponds to the target object and that is obtained according to second clinical prior knowledge.

For related details, reference may be made to the method embodiments shown in FIG. 3 to FIG. 5. The first obtaining module 1410 is further configured to implement any other function that is related to the obtaining step and that is implied or disclosed in the foregoing method embodiments. The slicing module 1420 is further configured to implement any other function that is related to a slicing step and that is implied or disclosed in the foregoing method embodiments. The first scanning module 1430 is further configured to implement any other function that is related to the scanning step and that is implied or disclosed in the foregoing method embodiments. The first segmentation module 1440 is further configured to implement any other function that is related to the segmentation step and that is implied or disclosed in the foregoing method embodiments. The fusion module 1450 is further configured to implement any other function that is related to a fusion step and that is implied or disclosed in the foregoing method embodiments. The first filtering module 1460 is further configured to implement any other function that is related to the filtering step and that is implied or disclosed in the foregoing method embodiments.

The semantic segmentation apparatus for a three-dimensional image provided in the foregoing embodiment is described only by using an example of division of the functional modules. In actual application, the functions may be allocated to different functional modules as required, which means that the internal structure of the apparatus is divided into different functional modules to complete all or some of the above described functions. In addition, the semantic segmentation apparatus for a three-dimensional image provided in the foregoing embodiment belongs to the same idea as the method embodiment of the semantic segmentation method for a three-dimensional image. For a specific implementation process, refer to the method embodiment. Details are not described herein again.

Figure 16:
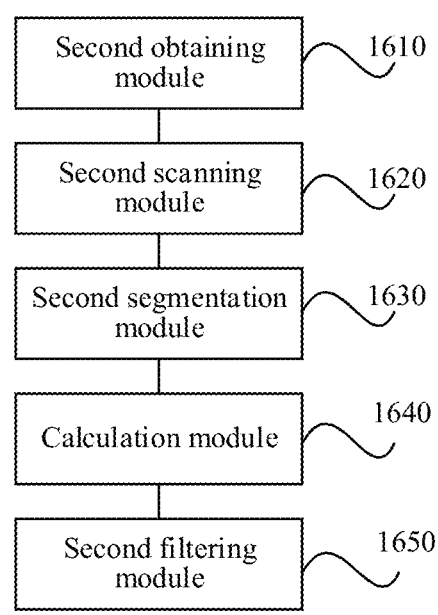
FIG. 16 is a schematic diagram of a semantic segmentation apparatus for a two-dimensional image according to an exemplary embodiment of the present disclosure.

FIG. 16 is a schematic diagram of a semantic segmentation apparatus for a two-dimensional image according to an exemplary embodiment of the present disclosure. The apparatus includes:
- a second obtaining module 1610, configured to obtain a two-dimensional image;
- a second scanning module 1620, configured to perform, when an aspect ratio of the two-dimensional image exceeds a preset ratio range, scanning-box segmentation on the two-dimensional image according to a square border formed by a short side length of the two-dimensional image, to obtain several to-be-processed two-dimensional images;
- a second segmentation module 1630, configured to invoke a segmentation model to perform semantic segmentation on the two-dimensional image, to obtain a distribution probability map of a target object,
- the segmentation model including: a deep network encoding unit and a skip transfer decoding unit, the deep network encoding unit including n convolutional layers, and the skip transfer decoding unit including m deconvolution layers, both n and m being a positive integer;
- the deep network encoding unit being configured to perform down-sampling feature extraction on the two-dimensional image through the n convolutional layers, to obtain a down-sampled third intermediate feature map; and the skip transfer decoding unit being configured to perform up-sampling processing on the third intermediate feature map and a fourth intermediate feature map through the m deconvolution layers, to obtain an up-sampled distribution probability map, the fourth intermediate feature map including a feature map outputted by an convolutional layer of the n convolutional layers, i being an integer less than or equal to n; and a calculation module 1640, configured to obtain a two-dimensional distribution binary image of the target object through calculation according to a maximum probability category of each pixel in the distribution probability map.

In some embodiments, the two-dimensional image is a two-dimensional medical image, and the apparatus further includes:

a second filtering module 1650, configured to filter out noise pixels in the two-dimensional distribution binary image based on clinical prior knowledge.

The clinical prior knowledge is knowledge obtained by collecting statistics on a distribution location of the target object in the two-dimensional medical image.

In some embodiments, the second filtering module 1650 is configured to filter out third noise pixels exceeding a target value range in the two-dimensional distribution binary image.

The target value range is a coordinate value range corresponding to appearance locations of the target object obtained according to third clinical prior knowledge.

For related details, refer to the method embodiment shown in FIG. 12. The second obtaining module 1610 is further configured to implement any other function that is related to the obtaining step and that is implied or disclosed in the foregoing method embodiment. The second scanning module 1620 is further configured to implement any other function that is related to the scanning step and that is implied or disclosed in the foregoing method embodiment. The second segmentation module 1630 is further configured to implement any other function that is related to the segmentation step and that is implied or disclosed in the foregoing method embodiment. The calculation module 1640 is further configured to implement any other function that is related to the calculation step and that is implied or disclosed in the foregoing method embodiment. The second filtering module 1650 is further configured to implement any other function that is related to the filtering step and that is implied or disclosed in the foregoing method embodiment.

The semantic segmentation apparatus for a two-dimensional image provided in the foregoing embodiment is described only by using an example of division of the functional modules. In actual application, the functions may be allocated to different functional modules as required, which means that the internal structure of the apparatus is divided into different functional modules to complete all or some of the above described functions. In addition, the semantic segmentation apparatus for a two-dimensional image provided in the foregoing embodiment belongs to the same idea as the method embodiment of the semantic segmentation method for a two-dimensional image. For a specific implementation process, refer to the method embodiment. Details are not described herein again.

Figure 17:
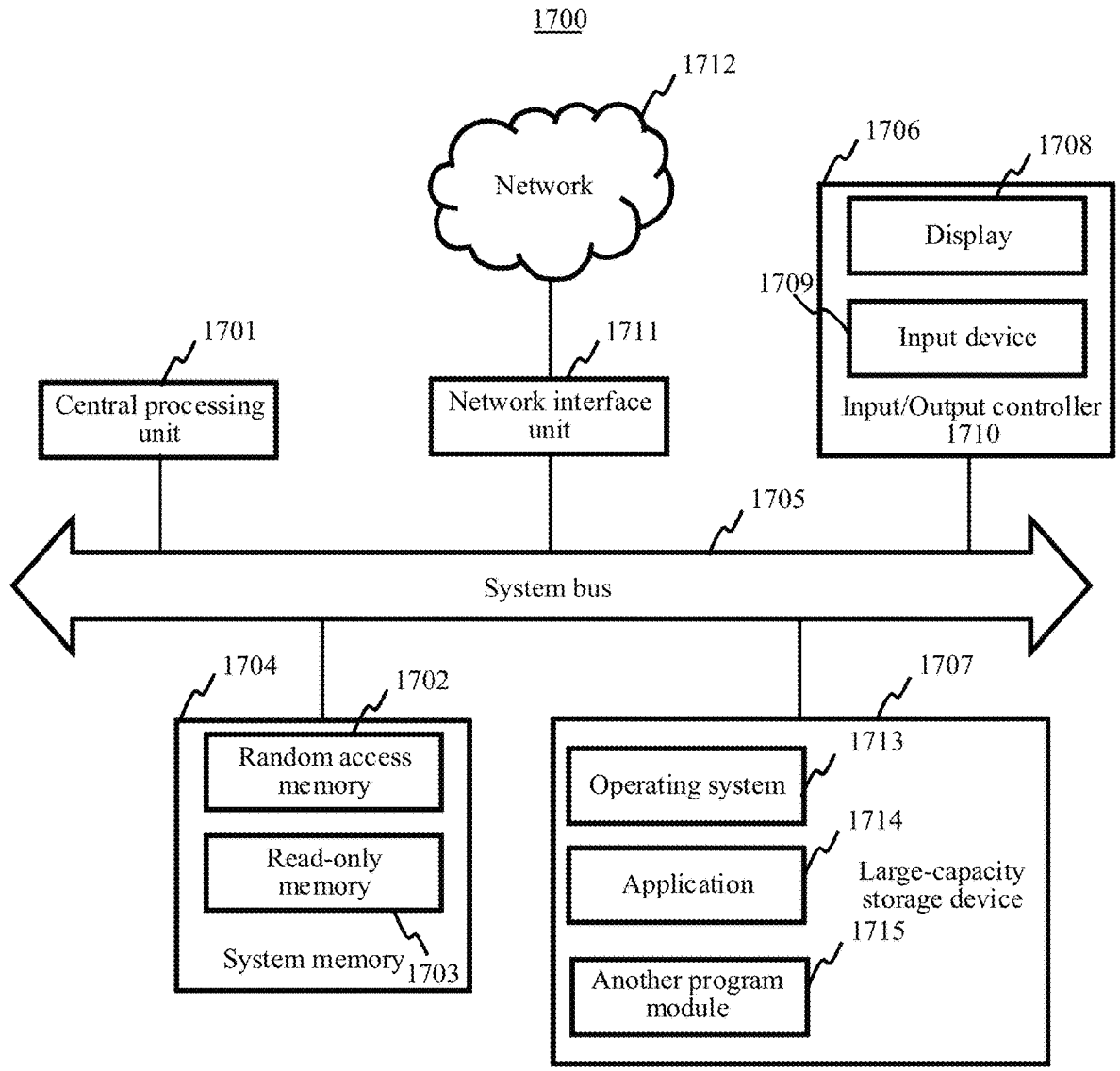
FIG. 17 is a schematic structural diagram of a computer device according to an exemplary embodiment of the present disclosure.

FIG. 17 is a schematic structural diagram of a computer device according to an embodiment of the present disclosure. The computer device is configured to implement the semantic segmentation method for a three-dimensional image and the semantic segmentation method for a two-dimensional image provided in the foregoing embodiments. Specifically, the computer device 1700 includes a central processing unit (CPU) 1701, a system memory 1704 including a random access memory (RAM) 1702 and a read-only memory (ROM) 1703, and a system bus 1705 connecting the system memory 1704 and the CPU 1701. The computer device 1700 further includes a basic input/output system (I/O system) 1706 used for helping information transmission between components in a computer, and a large-capacity storage device 1707 used for storing an operating system 1713, an application program 1714, and another program module 1715.

The basic I/O system 1706 includes a display 1708 configured to display information, and an input device 1709, such as a mouse or a keyboard, configured to input information by a user. The display 1708 and the input device 1709 are both connected to the CPU 1701 by using an input/output controller 1710 connected to the system bus 1705. The basic I/O system 1706 may further include the input and output controller 1710 to be configured to receive and process inputs from a plurality of other devices such as a keyboard, a mouse, and an electronic stylus. Similarly, the input/output controller 1710 further provides an output to a display screen, a printer, or another type of output device.

The large-capacity storage device 1707 is connected to the CPU 1701 by using a large-capacity storage controller (not shown) connected to the system bus 1705. The large-capacity storage device 1707 and an associated computer-readable medium thereof provide non-volatile storage for the computer device 1700. In other words, the large-capacity storage device 1707 may include the computer-readable medium (not shown) such as a hard disk or a CD-ROM driver.

In general, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in art can know that the computer storage medium is not limited to the foregoing several types. The system memory 1704 and the large-capacity storage device 1707 may be generally referred to as a memory.

According to the embodiments of the present disclosure, the computer device 1700 may further be connected, through a network such as the Internet, to a remote computer on the network and run. That is, the computer device 1700 may be connected to a network 1712 through a network interface unit 1711 connected to the system bus 1705, or may be connected to another type of network or a remote computer system (not shown) by using a network interface unit 1711.

The memory further includes one or more programs. The one or more programs are stored in the memory and configured to be executed by one or more processors. The one or more programs include instructions for performing the following operations:

obtaining a three-dimensional image; performing slicing on the three-dimensional image according to three directional planes in which three-dimensional coordinate axes are located, to obtain two-dimensional slice images of an x axis, two-dimensional slice images of a y axis, and two-dimensional slice images of a z axis; invoking a first segmentation model to perform semantic segmentation on the two-dimensional slice images of the x axis, to obtain a distribution probability map of a target object on an x-axis directional plane; invoking a second segmentation model to perform semantic segmentation on the two-dimensional slice images of they axis, to obtain a distribution probability map of the target object on the y-axis directional plane; invoking a third segmentation model to perform semantic segmentation on the two-dimensional slice images of the z axis, to obtain a distribution probability map of the target object on the z-axis directional plane; and invoking an adaptive fusion model to perform three-dimensional fusion on the three distribution probability maps respectively corresponding to the x-axis directional plane, the y-axis directional plane, and the z-axis directional plane, to obtain a three-dimensional distribution binary image of the target object.

Assuming that the foregoing is a first possible implementation, on the basis of the first possible implementation, in a second possible implementation, the memory of the computer device may further include an instruction for performing the following operations:

obtaining a two-dimensional image; invoking a segmentation model to perform semantic segmentation on the two-dimensional image, to obtain a distribution probability map of a target object; and obtaining a two-dimensional distribution binary image of the target object through calculation according to a maximum probability category of each pixel in the distribution probability map.

Figure 18:
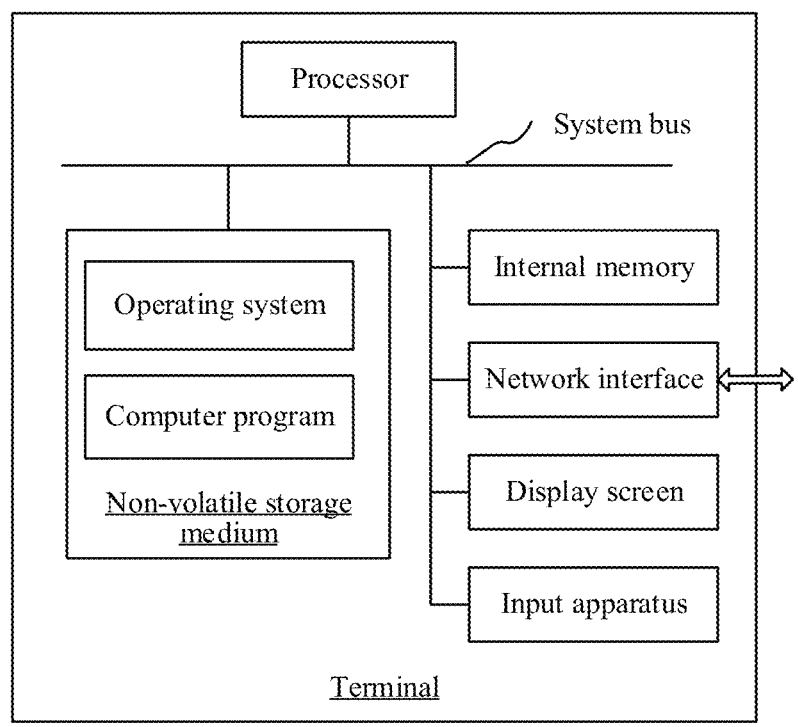
FIG. 18 is a diagram of an internal structure of a terminal according to an exemplary embodiment of the present disclosure.

FIG. 18 is a diagram of an internal structure of a terminal according to an embodiment. As shown in FIG. 18, the terminal includes a processor, a memory, a network interface, a display screen, and an input apparatus that are connected by using a system bus. The processor of the terminal is configured to provide computing and control capabilities. The memory of the terminal includes a non-volatile storage medium and an internal memory. The non-volatile storage medium stores an operating system and a computer program. The internal memory provides an environment for running of the operating system and the computer program in the non-volatile storage medium. The memory includes a non-volatile storage medium and an internal memory. The non-volatile storage medium of the terminal stores an operating system, and may further store computer-readable instructions. The computer-readable instructions, when executed by the processor, may cause the processor to perform the semantic segmentation method for a three-dimensional image and a semantic segmentation method for a two-dimensional image. The internal memory may also store computer-readable instructions, and the computer-readable instructions, when executed by the processor, may cause the processor to perform the semantic segmentation method for a three-dimensional image and the semantic segmentation method for a two-dimensional image. The network interface of the terminal is configured to communicate with an external terminal through a network connection. The display screen of the terminal may be a liquid crystal display screen or an electronic ink display screen. The input apparatus of the terminal may be a touchscreen covering the display screen, or may be a key, a trackball, or a touchpad disposed on a housing of the terminal, or may be an external keyboard, a touchpad, a mouse, or the like.

A person skilled in the art may understand that, in the structure shown in FIG. 18, only a block diagram of a partial structure related to a solution in the present disclosure is shown, which does not constitute a limitation to the terminal to which the solution in the present disclosure is applied. Specifically, the terminal may include more or fewer components than those shown in the figure, or some components may be combined, or a different component deployment may be used.

In an embodiment, the semantic segmentation apparatus for a three-dimensional image and the semantic segmentation apparatus for a two-dimensional image provided in the present disclosure may be implemented in a form of computer-readable instructions, and the computer-readable instructions may be run on the terminal shown in FIG. 18. The memory of the terminal may store program modules forming the semantic segmentation apparatus for a three-dimensional image and the semantic segmentation apparatus for a two-dimensional image, for example, the first obtaining module 1410, the slicing module 1420, the first scanning module 1430, the first segmentation module 1440, and the fusion module 1450. Computer-readable instructions formed by the program modules cause the processor to perform the steps in the semantic segmentation method for a three-dimensional image and the semantic segmentation method for a two-dimensional image in the embodiments of the present disclosure described in this specification.

A person skilled in the art may understand that, in the structure shown in FIG. 18, only a block diagram of a partial structure related to a solution in the present disclosure is shown, which does not constitute a limitation to the terminal to which the solution in the present disclosure is applied. Specifically, the terminal may include more or fewer components than those shown in the figure, or some components may be combined, or a different component deployment may be used.

An embodiment of the present disclosure provides a computer-readable storage medium, storing computer-readable instructions, the computer-readable instructions being loaded and executed by a processor to perform operations performed in the semantic segmentation method for a three-dimensional image and the semantic segmentation method for a two-dimensional image according to the foregoing embodiments.

A person of ordinary skill in the art may understand that all or some of the procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the various embodiments provided in the present disclosure may include a non-volatile and/or volatile memory. The non-volatile memory may include a ROM, a programmable ROM (PROM), an electrically programmable ROM (EPROM), an electrically erasable programmable ROM (EEPROM) or a flash memory. The volatile memory may include a RAM or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (RDRAM). It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of the present disclosure are merely for description purpose, and do not indicate the preference among the embodiments.

A person skilled in the art can easily figure out other implementation solutions of the present disclosure after considering the specification and practicing the present disclosure disclosed herein. The present disclosure is intended to cover any variation, use, or adaptive change of the present disclosure. The variations, uses, or adaptive changes follow the general principles of the present disclosure and include common general knowledge or common technical means in the art that are not disclosed in the present disclosure. The specification and the embodiments are merely considered as examples, and the real scope and spirit of the present disclosure are pointed out in the following claims.

It is to be understood that the present disclosure is not limited to the accurate structures that are described above and that are shown in the accompanying drawings, and modifications and changes may be made without departing from the scope of the present disclosure. The scope of the present disclosure is subject only to the appended claims.

What is claimed is:

1. A semantic segmentation method for a three-dimensional image performed by a terminal, comprising:
    obtaining a three-dimensional image;
    slicing the three-dimensional image according to three directional planes in which three-dimensional coordinate axes are located, to obtain two-dimensional slice images of an x axis, two-dimensional slice images of a y axis, and two-dimensional slice images of a z axis;
    invoking a first segmentation model to perform semantic segmentation on the two-dimensional slice images of the x axis, to obtain a distribution probability map of a target object on an x-axis directional plane;
    invoking a second segmentation model to perform semantic segmentation on the two-dimensional slice images of they axis, to obtain a distribution probability map of the target object on a y-axis directional plane;
    invoking a third segmentation model to perform semantic segmentation on the two-dimensional slice images of the z axis, to obtain a distribution probability map of the target object on a z-axis directional plane;
    invoking an adaptive fusion model to combine the three distribution probability maps respectively corresponding to the x-axis directional plane, the y-axis directional plane, and the z-axis directional plane, to obtain a three-dimensional distribution feature map;
    performing three-dimensional fusion convolution on the three-dimensional distribution feature map, to obtain a three-dimensional segmentation probability map;
    obtaining a three-dimensional distribution binary image of the target object through calculation according to maximum probability categories of pixels in the three-dimensional segmentation probability map; and
    filtering out noise pixels in the three-dimensional distribution binary image based on prior knowledge, the prior knowledge being obtained by collecting statistics on a distribution location of the target object in sample three-dimensional images.

2. The method according to claim 1, wherein at least one model of the first segmentation model, the second segmentation model, or the third segmentation model comprises: a deep network encoding unit and a skip transfer decoding unit, the deep network encoding unit comprising n convolutional layers, and the skip transfer decoding unit comprising m deconvolution layers, both n and m being positive integers; and the method further comprises:
    performing, by the deep network encoding unit, down-sampling feature extraction on a two-dimensional slice image through the n convolutional layers, to obtain a down-sampled first intermediate feature map; and
    performing, by the skip transfer decoding unit, up-sampling processing on the first intermediate feature map and a second intermediate feature map through the m deconvolution layers, to obtain an up-sampled distribution probability map,
    the second intermediate feature map comprising a feature map outputted by an ith convolutional layer of the n convolutional layers, i being an integer less than or equal to n.

3. The method according to claim 1, wherein the three-dimensional image is a three-dimensional medical image; and
    the prior knowledge is clinical prior knowledge, the clinical prior knowledge being obtained by collecting statistics on the distribution location of the target object in sample three-dimensional medical images.

4. The method according to claim 1, wherein the filtering out noise pixels in the three-dimensional distribution binary image based on prior knowledge comprises:
    filtering out a first noise pixel exceeding a target value range in the three-dimensional distribution binary image,
    wherein the target value range corresponding to appearance locations of the target object is obtained according to first prior knowledge.

5. The method according to claim 1, wherein the filtering out noise pixels in the three-dimensional distribution binary image based on prior knowledge comprises:
    filtering out second noise pixels outside a three-dimensional ellipsoidal model in the three-dimensional distribution binary image,
    wherein the three-dimensional ellipsoidal model corresponds to the target object and is obtained according to second prior knowledge.

6. The method according to claim 1, further comprising:
    performing, by the terminal when an aspect ratio of a two-dimensional slice image exceeds a preset ratio range, scanning-box segmentation on the two-dimensional slice image according to a square border formed by a short side length of the two-dimensional slice image, to obtain several to-be-processed two-dimensional slice images.

7. A semantic segmentation apparatus for a three-dimensional image, the apparatus comprising: at least one processor and at least one memory, the at least one memory storing computer-readable instructions, wherein the at least one processor, when executing the computer-readable instructions, is configured to:
    obtain a three-dimensional image;
    slice the three-dimensional image according to three directional planes in which three-dimensional coordinate axes are located, to obtain two-dimensional slice images of an x axis, two-dimensional slice images of a y axis, and two-dimensional slice images of a z axis;
    invoke a first segmentation model to perform semantic segmentation on the two-dimensional slice images of the x axis, to obtain a distribution probability map of a target object on an x-axis directional plane, invoke a second segmentation model to perform semantic segmentation on the two-dimensional slice images of they axis, to obtain a distribution probability map of the target object on a y-axis directional plane;

invoke a third segmentation model to perform semantic segmentation on the two-dimensional slice images of the z axis, to obtain a distribution probability map of the target object on a z-axis directional plane;

invoke an adaptive fusion model to combine the three distribution probability maps respectively corresponding to the x-axis directional plane, the y-axis directional plane, and the z-axis directional plane, to obtain a three-dimensional distribution feature map;

perform three-dimensional fusion convolution on the three-dimensional distribution feature map, to obtain a three-dimensional segmentation probability map;

obtain a three-dimensional distribution binary image of the target object through calculation according to maximum probability categories of pixels in the three-dimensional segmentation probability map; and filter out noise pixels in the three-dimensional distribution binary image based on prior knowledge, the prior knowledge being obtained by collecting statistics on a distribution location of the target object in sample three-dimensional images.

8. The apparatus according to claim 7, wherein at least one model of the first segmentation model, the second segmentation model, or the third segmentation model comprises: a deep network encoding unit and a skip transfer decoding unit, the deep network encoding unit comprising n convolutional layers, and the skip transfer decoding unit comprising m deconvolution layers, both n and m being a positive integer;

the deep network encoding unit is configured to perform down-sampling feature extraction on a two-dimensional slice image through the n convolutional layers, to obtain a down-sampled first intermediate feature map; and the skip transfer decoding unit is configured to perform up-sampling processing on the first intermediate feature map and a second intermediate feature map through the m deconvolution layers, to obtain an up-sampled distribution probability map, the second intermediate feature map comprising a feature map outputted by an ith convolutional layer of the n convolutional layers, i being an integer less than or equal to n.

9. The apparatus according to claim 7, wherein the three-dimensional image is a three-dimensional medical image, and the prior knowledge is clinical prior knowledge obtained by collecting statistics on the distribution location of the target object in sample three-dimensional medical images.

10. The apparatus according to claim 7, wherein the at least one processor is further configured to filter out first noise pixels exceeding a target value range in the three-dimensional distribution binary image, the target value range being a coordinate value range corresponding to appearance locations of the target object obtained according to first prior knowledge.

11. The apparatus according to claim 7, wherein the at least one processor is further configured to filter out second noise pixels outside a three-dimensional ellipsoidal model in the three-dimensional distribution binary image, wherein the three-dimensional ellipsoidal model corresponds to the target object and is obtained according to second prior knowledge.

12. The apparatus according to claim 7, wherein the at least one processor is further configured to:

perform, when an aspect ratio of a two-dimensional slice image exceeds a preset ratio range, scanning-box segmentation on the two-dimensional slice image according to a square border formed by a short side length of the two-dimensional slice image, to obtain several to-be-processed two-dimensional slice images.

13. One or more non-transitory storage media storing computer-readable instructions, the computer-readable instructions, when executed by one or more processors, causing the one or more processors to perform:

obtaining a three-dimensional image;

slicing the three-dimensional image according to three directional planes in which three-dimensional coordinate axes are located, to obtain two-dimensional slice images of an x axis, two-dimensional slice images of a y axis, and two-dimensional slice images of a z axis;

invoking a first segmentation model to perform semantic segmentation on the two-dimensional slice images of the x axis, to obtain a distribution probability map of a target object on an x-axis directional plane;

invoking a second segmentation model to perform semantic segmentation on the two-dimensional slice images of they axis, to obtain a distribution probability map of the target object on a y-axis directional plane;

invoking a third segmentation model to perform semantic segmentation on the two-dimensional slice images of the z axis, to obtain a distribution probability map of the target object on a z-axis directional plane;

invoking an adaptive fusion model to combine the three distribution probability maps respectively corresponding to the x-axis directional plane, the y-axis directional plane, and the z-axis directional plane, to obtain a three-dimensional distribution feature map;

performing three-dimensional fusion convolution on the three-dimensional distribution feature map, to obtain a three-dimensional segmentation probability map;

obtaining a three-dimensional distribution binary image of the target object through calculation according to maximum probability categories of pixels in the three-dimensional segmentation probability map; and filtering out noise pixels in the three-dimensional distribution binary image based on prior knowledge, the prior knowledge being obtained by collecting statistics on a distribution location of the target object in sample three-dimensional images.

14. The storage media according to claim 13, wherein at least one model of the first segmentation model, the second segmentation model, or the third segmentation model comprises: a deep network encoding unit and a skip transfer decoding unit, the deep network encoding unit comprising n convolutional layers, and the skip transfer decoding unit comprising m deconvolution layers, both n and m being positive integers; and the computer-readable instructions further cause the one or more processors to perform:

performing, by the deep network encoding unit, down-sampling feature extraction on a two-dimensional slice image through the n convolutional layers, to obtain a down-sampled first intermediate feature map; and performing, by the skip transfer decoding unit, up-sampling processing on the first intermediate feature map and a second intermediate feature map through the m deconvolution layers, to obtain an up-sampled distribution probability map, the second intermediate feature map comprising a feature map outputted by an ith convolutional layer of the n convolutional layers, i being an integer less than or equal to n.

15. The storage media according to claim 13, wherein the three-dimensional image is a three-dimensional medical image; and the prior knowledge is clinical prior knowledge obtained by collecting statistics on the distribution location of the target object in sample three-dimensional medical images.

16. The storage media according to claim 13, wherein the filtering out noise pixels in the three-dimensional distribution binary image based on prior knowledge comprises:
   filtering out a first noise pixel exceeding a target value range in the three-dimensional distribution binary image,
   wherein the target value range corresponding to appearance locations of the target object is obtained according to first prior knowledge.

17. The storage media according to claim 13, wherein the filtering out noise pixels in the three-dimensional distribution binary image based on prior knowledge comprises:
   filtering out second noise pixels outside a three-dimensional ellipsoidal model in the three-dimensional distribution binary image,
   wherein the three-dimensional ellipsoidal model corresponds to the target object and is obtained according to second prior knowledge.

\* \* \* \* \*